United States Patent
Shinomiya

(10) Patent No.: US 8,713,161 B2
(45) Date of Patent: Apr. 29, 2014

(54) IMAGE PROCESSING APPARATUS, REMOTE MANAGEMENT SYSTEM, LICENSE UPDATE METHOD, AND COMPUTER PROGRAM PRODUCT

(75) Inventor: Kiyohiko Shinomiya, Tokyo (JP)

(73) Assignee: Ricoh Company, Limited, Tokyo (JP)

( * ) Notice: Subject to any disclaimer, the term of this patent is extended or adjusted under 35 U.S.C. 154(b) by 402 days.

(21) Appl. No.: 12/875,471

(22) Filed: Sep. 3, 2010

(65) Prior Publication Data

US 2011/0066721 A1 Mar. 17, 2011

(30) Foreign Application Priority Data

Sep. 15, 2009 (JP) ................................. 2009-213836

(51) Int. Cl.
*G06F 15/173* (2006.01)

(52) U.S. Cl.
USPC .......................................... 709/224; 709/203

(58) Field of Classification Search
USPC ................................................ 709/224, 203
See application file for complete search history.

(56) References Cited

U.S. PATENT DOCUMENTS

| | | | | |
|---|---|---|---|---|
| 5,758,068 | A * | 5/1998 | Brandt et al. .................... | 726/27 |
| 6,023,766 | A * | 2/2000 | Yamamura ....................... | 726/29 |
| 7,831,517 | B1 * | 11/2010 | Vijay et al. ....................... | 705/59 |
| 2001/0037403 | A1 * | 11/2001 | Mougi et al. .................... | 709/238 |
| 2002/0120579 | A1 * | 8/2002 | Kawaguchi et al. ............. | 705/59 |
| 2002/0120726 | A1 * | 8/2002 | Padole et al. ................... | 709/222 |
| 2003/0160823 | A1 * | 8/2003 | Stannard ....................... | 345/764 |
| 2003/0191961 | A1 * | 10/2003 | Zunke ............................ | 713/200 |
| 2004/0024688 | A1 * | 2/2004 | Bi et al. ........................... | 705/37 |
| 2004/0039916 | A1 * | 2/2004 | Aldis et al. ...................... | 713/177 |
| 2004/0054909 | A1 * | 3/2004 | Serkowski et al. ............. | 713/176 |
| 2004/0221170 | A1 * | 11/2004 | Colvin ........................... | 713/193 |
| 2006/0064387 | A1 * | 3/2006 | Jose et al. ....................... | 705/59 |
| 2007/0067243 | A1 * | 3/2007 | Malik ............................ | 705/59 |

(Continued)

FOREIGN PATENT DOCUMENTS

| | | |
|---|---|---|
| CN | 1713103 A | 12/2005 |
| CN | 1795452 A | 6/2006 |

(Continued)

OTHER PUBLICATIONS

Combined Chinese Office Action and Search Report issued Oct. 30, 2012, in Patent Application No. 201010286423.6 (with English-language translation).

(Continued)

*Primary Examiner* — Waseem Ashraf
(74) *Attorney, Agent, or Firm* — Oblon, Spivak, McClelland, Maier & Neustadt, L.L.P.

(57) ABSTRACT

An image processing apparatus includes an HDD that stores therein a license file containing an expiration date of a license of an application and a class of the license, a detecting unit that acquires the expiration date from the license file and detects whether the expiration date has passed, a class identifying unit that identifies a class of the license whose expiration date is detected as having passed, based on the license file, an update-process determining unit that determines a method of performing an update process based on the class, a license-file acquiring unit that acquires a license file from the license file management server based on the method of performing the update process, and a replacing unit that replaces the license file stored in the HDD with the license file acquired by the license-file acquiring unit.

7 Claims, 20 Drawing Sheets

| NO. | TYPE (CLASS) | DESCRIPTION OF TYPE (CLASS) | LIST |
|---|---|---|---|
| 1 | FLAT MONTHLY RATE AGREEMENT | AGREEMENT TO LEND RIGHT TO USE FUNCTION TO CUSTOMER AT FIXED RATE | OFFICIAL LICENSE (AUTO RENEWAL) |
| 2 | VARIABLE RATE AGREEMENT | AGREEMENT TO LEND RIGHT TO USE FUNCTION TO CUSTOMER AT RATE DEPENDING ON USAGE OF FUNCTION (VARIABLE RATE) | |
| 3 | LIMITED-PERIOD USE AGREEMENT | AGREEMENT TO LEND RIGHT TO USE FUNCTION TO CUSTOMER FOR PERIOD DEFINED IN AGREEMENT | OFFICIAL LICENSE (SUBSCRIPTION PERIOD) |
| 4 | SELLOUT AGREEMENT | AGREEMENT TO SELL RIGHT TO USE FUNCTION TO CUSTOMER | OFFICIAL LICENSE (NO PERIOD LIMIT) |
| 5 | TRIAL AGREEMENT | AGREEMENT TO LEND RIGHT TO USE FUNCTION TO CUSTOMER FREE OF CHARGE FOR PREDETERMINED PERIOD | TRIAL VERSION LICENSE (TRIAL) |

(56) References Cited

U.S. PATENT DOCUMENTS

| | | | |
|---|---|---|---|
| 2007/0143749 A1* | 6/2007 | Date et al. | 717/172 |
| 2007/0226149 A1* | 9/2007 | McFarlin et al. | 705/59 |
| 2007/0244824 A1* | 10/2007 | Motley et al. | 705/59 |
| 2008/0098216 A1* | 4/2008 | Scovetta | 713/165 |
| 2008/0098465 A1* | 4/2008 | Ramakrishna et al. | 726/5 |
| 2008/0262968 A1* | 10/2008 | Saxena et al. | 705/51 |
| 2008/0319779 A1* | 12/2008 | Hughes et al. | 705/1 |
| 2009/0037452 A1* | 2/2009 | Baitalmal et al. | 707/101 |
| 2009/0254482 A1* | 10/2009 | Vadlamani et al. | 705/59 |
| 2009/0326964 A1* | 12/2009 | Garg et al. | 705/1 |
| 2010/0057703 A1* | 3/2010 | Brandt et al. | 707/4 |
| 2011/0061047 A1* | 3/2011 | Tyamagondlu et al. | 717/177 |

FOREIGN PATENT DOCUMENTS

| | | |
|---|---|---|
| CN | 1879112 A | 12/2006 |
| CN | 1882962 A | 12/2006 |
| CN | 1914578 A | 2/2007 |
| JP | 2006-235963 | 9/2006 |
| JP | 2008-16013 | 1/2008 |
| JP | 4121344 | 5/2008 |
| WO | WO 00/57684 | 10/2000 |

OTHER PUBLICATIONS

Extended European Search Report issued Jun. 6, 2012 in Patent Application No. 10251595.4.

Anonymous: "How Microsoft Product Activation (WPA) Works in Windows XP and Windows Vista", Retrieved from the Internet: URL:http://web.archive.org/web/20080510105322/http://www.pcbuyerbeware.co.uk/ProductActivation.htm, XP-002613942, May 10, 2008, pp. 1-11.

Office Action issued Jun. 7, 2013 in Chinese Application No. 201010286423.6 (With English Translation).

* cited by examiner

FIG. 4

| NO. | TYPE (CLASS) | DESCRIPTION OF TYPE (CLASS) | LIST |
|---|---|---|---|
| 1 | FLAT MONTHLY RATE AGREEMENT | AGREEMENT TO LEND RIGHT TO USE FUNCTION TO CUSTOMER AT FIXED RATE | OFFICIAL LICENSE (AUTO RENEWAL) |
| 2 | VARIABLE RATE AGREEMENT | AGREEMENT TO LEND RIGHT TO USE FUNCTION TO CUSTOMER AT RATE DEPENDING ON USAGE OF FUNCTION (VARIABLE RATE) | OFFICIAL LICENSE (SUBSCRIPTION PERIOD) |
| 3 | LIMITED-PERIOD USE AGREEMENT | AGREEMENT TO LEND RIGHT TO USE FUNCTION TO CUSTOMER FOR PERIOD DEFINED IN AGREEMENT | |
| 4 | SELLOUT AGREEMENT | AGREEMENT TO SELL RIGHT TO USE FUNCTION TO CUSTOMER | OFFICIAL LICENSE (NO PERIOD LIMIT) |
| 5 | TRIAL AGREEMENT | AGREEMENT TO LEND RIGHT TO USE FUNCTION TO CUSTOMER FREE OF CHARGE FOR PREDETERMINED PERIOD | TRIAL VERSION LICENSE (TRIAL) |

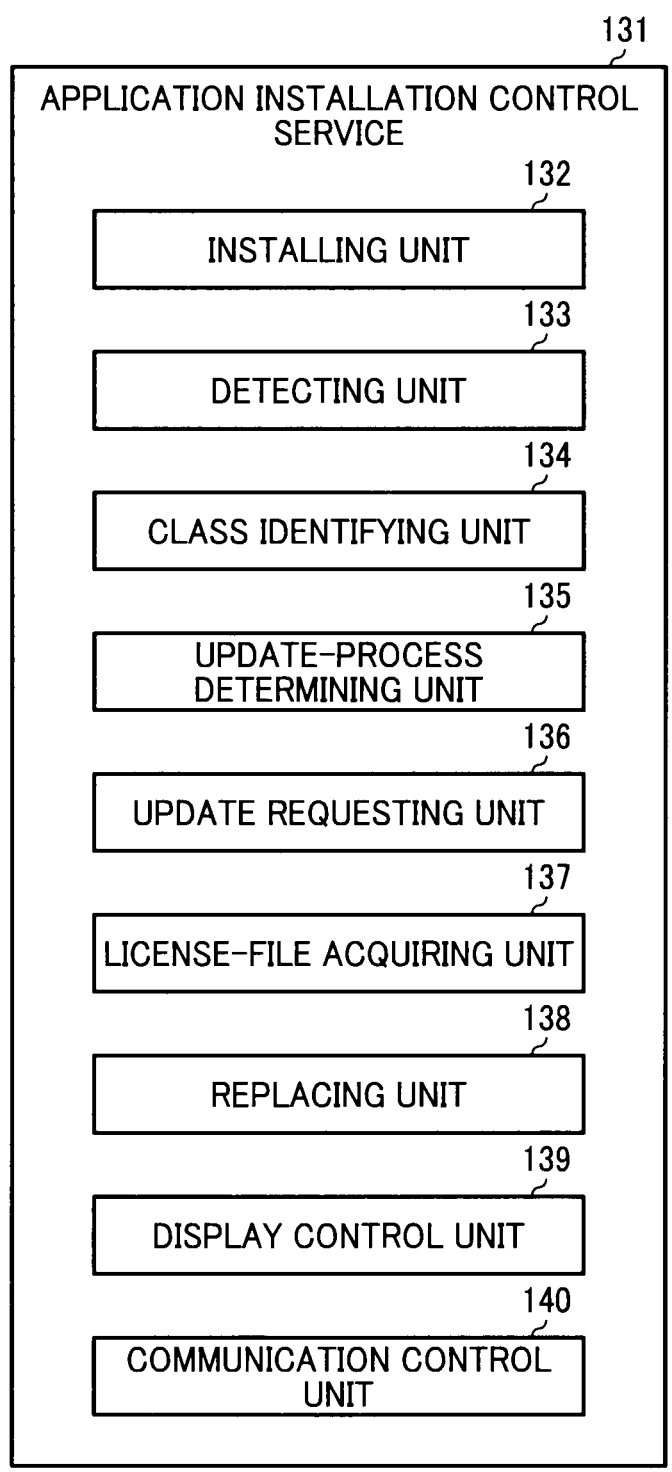

FIG. 8

```
<?xml version="1.0" ?>
    <requestlist requestType="activate">            ---->DETAILS OF LICENSE ISSUANCE REQUEST
    <activateRequest>
        <productKey>LABCDEFGH6JKLMNPQRST92345</productKey>    ---->PRODUCT KEY
        <machineType>3A84</machineType>             ---->MACHINE TYPE
        <serialNumber>617505</serialNumber>         ---->SERIAL NUMBER OF APPARATUS
        <id>abcdefghij1234567</id>                  ---->ID
    </activateRequest>
    <activateRequest>
        <productKey>LLMNPQRST52345ABCDEFGH9JK</productKey>
        <machineType>3A84</machineType>
        <serialNumber>617505</serialNumber>
        <id>abcdefghij1234567</id>
    </activateRequest>
</requestlist>
```

FIG. 13

| INPUT OF PRODUCT KEY | ◊ BOOKMARK  ◊ UPDATE  [?] |
|---|---|

LISTED BELOW ARE PACKAGES WITH ACQUIRED PRODUCT KEY S

INPUT ACQUIRED PRODUCT KEY S
UP TO 5 PRODUCT KEYS CAN BE INSTALLED AT ONE TIME

PRODUCT KEY 1 [          ]
PRODUCT KEY 2 [          ]
PRODUCT KEY 3 [          ]
PRODUCT KEY 4 [          ]
PRODUCT KEY 5 [          ]

[RETURN] [NEXT]  Copyright © 2006 Ricoh Company. Ltd. All Rights Reserved.

FIG. 14

LICENSE ACQUISITION/UPDATE

IN PROGRESS

Copyright © 2006 Ricoh Company. Ltd. All Rights Reserved.

FIG. 15

| | | NAME (VERSION) ▼ | VENDOR NAME | LICENSE TYPE | EXPIRATION DATE | STATUS |
|---|---|---|---|---|---|---|
| ☑ | | ⊟ PACKAGE 1<br><br>EXTENSION 1-1(1.0)<br>EXTENSION 1-2(1.0) | Ricoh | CLIENT LOCKED LICENSE | 2009/03/31 | VALID/ACTIVATED |
| ☑ | | ⊞ PACKAGE 2 | Ricoh | TRIAL VERSION LICENSE | 2009/03/31 | VALID/ACTIVATED |
| ☑ | | ⊞ PACKAGE 3 | Ricoh | TRIAL VERSION LICENSE (CHANGED) | 2009/03/31 | INVALID/ACTIVATED |
| ☐ | | ⊞ PACKAGE 4 | Ricoh | TIME-LIMITED LICENSE (WITHOUT AUTOMATIC UPDATE) | 2009/03/31 | INACTIVATED |

EXTENSIONS MANAGEMENT  □ BOOKMARK  ○ UPDATE  [?]

FORWARD MATCHING ▼ | FORWARD MATCHING | SEARCH

○ UPDATE PLUG-IN

PACKAGE | EXTENSIONS | FIRMWARE

🖶 PRINT

VALID/INVALID | ↓ INSTALL | ↑ UN-INSTALL | LICENSE ACQUISITION/UPDATE | LICENSE DEACTIVATION

« < 1-4 / 4 > »  10 ITEMS ▼ / PAGE  1 /2 PAGE  MOVE

RETURN                Copyright © 2006 Ricoh Company. Ltd. All Rights Reserved.

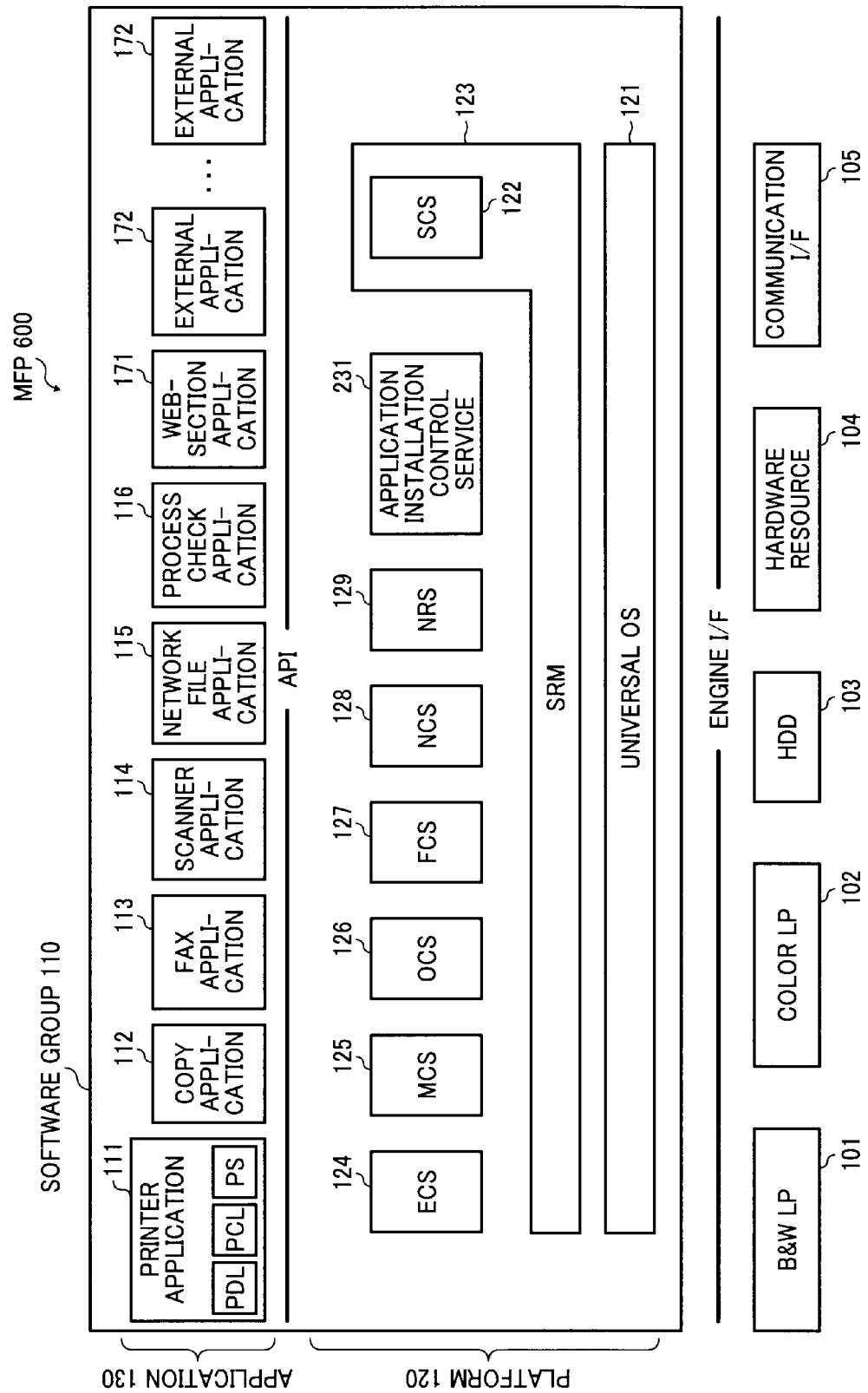

IMAGE PROCESSING APPARATUS, REMOTE MANAGEMENT SYSTEM, LICENSE UPDATE METHOD, AND COMPUTER PROGRAM PRODUCT

CROSS-REFERENCE TO RELATED APPLICATIONS

The present application claims priority to and incorporates by reference the entire contents of Japanese Patent Application No. 2009-213836 filed in Japan on Sep. 15, 2009.

BACKGROUND OF THE INVENTION

1. Field of the Invention

The present invention relates to an image processing apparatus, a remote management system, a license update method, and a computer program product for managing and updating a license.

2. Description of the Related Art

Conventionally, a method has been developed for automatically performing a process of updating a license of an application installed in an image processing apparatus. For example, a method has been proposed in which a timing to update a license is determined based on an expiration date to automatically update the license (see, for example, Japanese Patent Application Laid-open No. 2006-235963).

In the technology disclosed in Japanese Patent Application Laid-open No. 2006-235963, a method is proposed in which information is input to an input box to set how many days before a license expiration date a license is automatically updated and whether to automatically update the license before the number of printed sheets exceeds the upper limit so that a timing to update the license can be determined based on setting information and license information (e.g., the expiration date and the upper-limit number of printed sheets) that are managed separately, and a license update request can automatically be performed at the timing.

However, in the method disclosed in Japanese Patent Application Laid-open No. 2006-235963, it is difficult to change a type of a license at the timing of the automatic update. Therefore, when an agreement type is to be changed, it is necessary to perform operation of cancelling an agreement and then perform works to newly install a newly-purchased program on an apparatus side. Furthermore, it is impossible to change only the agreement type for an identical program. Thus, in the method disclosed in Japanese Patent Application Laid-open No. 2006-235963, the type of a license cannot be changed at the time of update, leading to cumbersome and complicated operation.

The present invention has been made in view of the above, and it is an object of the present invention to provide an image processing apparatus, a remote management system, a license update method, and a computer program product capable of enhancing convenience.

SUMMARY OF THE INVENTION

It is an object of the present invention to at least partially solve the problems in the conventional technology.

According to an aspect of the present invention, there is provided an image processing apparatus connected to a license management server that manages a license of an application, the image processing apparatus including a storage unit that stores therein a license file containing an expiration date of the license of the application and a class of the license; a detecting unit that acquires the expiration date from the license file and detects whether the expiration date has passed; a class identifying unit that identifies a class of the license whose expiration date is detected as having passed, based on the license file; an update-process determining unit that determines a method of performing an update process based on the identified class; a license-file acquiring unit that acquires a license file from the license file management server based on the determined method of performing the update process; and a replacing unit that replaces the license file stored in the storage unit with the license file acquired by the license-file acquiring unit.

According to another aspect of the present invention, there is provided a remote management system that includes an image processing apparatus and a license management server that manages a license of an application, wherein the image processing apparatus includes a storage unit that stores therein a license file containing an expiration date of the license of the application and a class of the license; a detecting unit that acquires the expiration date from the license file and detects whether the expiration date has passed; a class identifying unit that identifies a class of the license whose expiration date is detected as having passed, based on the license file; an update-process determining unit that determines a method of performing an update process based on the identified class; a license-file acquiring unit that acquires a license file from the license file management server based on the determined method of performing the update process; and a replacing unit that replaces the license file stored in the storage unit with the license file acquired by the license-file acquiring unit, and the license management server includes a receiving unit that receives a request to update a license from the image processing apparatus; and a transmitting unit that transmits a license file according to the request.

According to sill another aspect of the present invention, there is provided a computer program product comprising a computer usable medium having computer-readable program codes embodied in the medium to be executed by a computer that includes a storage unit that stores therein a license file containing an expiration date of a license of an application and a class of the license, the program codes when executed causing the computer to execute acquiring the expiration date from the license file; determining whether the expiration date acquired at the acquiring has passed; identifying a class of the license whose expiration date is detected as having passed at the determining, based on the license file; determining a method of performing an update process based on the class identified at the identifying; acquiring a license file from the license management server based on the method of performing the update process determines at the determining; and replacing the license file stored in the storage unit with the license file acquired at the acquiring the license file.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 4 is a diagram illustrating examples of license types;

FIG. 7 is a diagram for explaining functions of an application installation control service;

FIG. 8 is a diagram illustrating an example of a request file;

FIG. 13 is a diagram illustrating an example of a product-key input screen;

FIG. 14 illustrates a screen for indicating a license-update executing state;

FIG. 15 is a diagram illustrating an example of a list screen displayed after update or an invalidation process;

FIG. 16 is a software configuration diagram of an MFP according to another embodiment;

DETAILED DESCRIPTION OF THE PREFERRED EMBODIMENTS

Exemplary embodiments of the present invention will be explained in detail below with reference to the accompanying drawings. In the following embodiments, an example is described in which an image processing apparatus according to the present invention is applied to an MFP (Multi Function Peripheral) that has a plurality of functions of a copier, a facsimile machine, a printer, and the like in one casing. However, the present invention is not limited to the embodiments, and may be applied to any application-installable image processing apparatuses such as MFPs, facsimile machines, and scanner devices.

Figure 1:
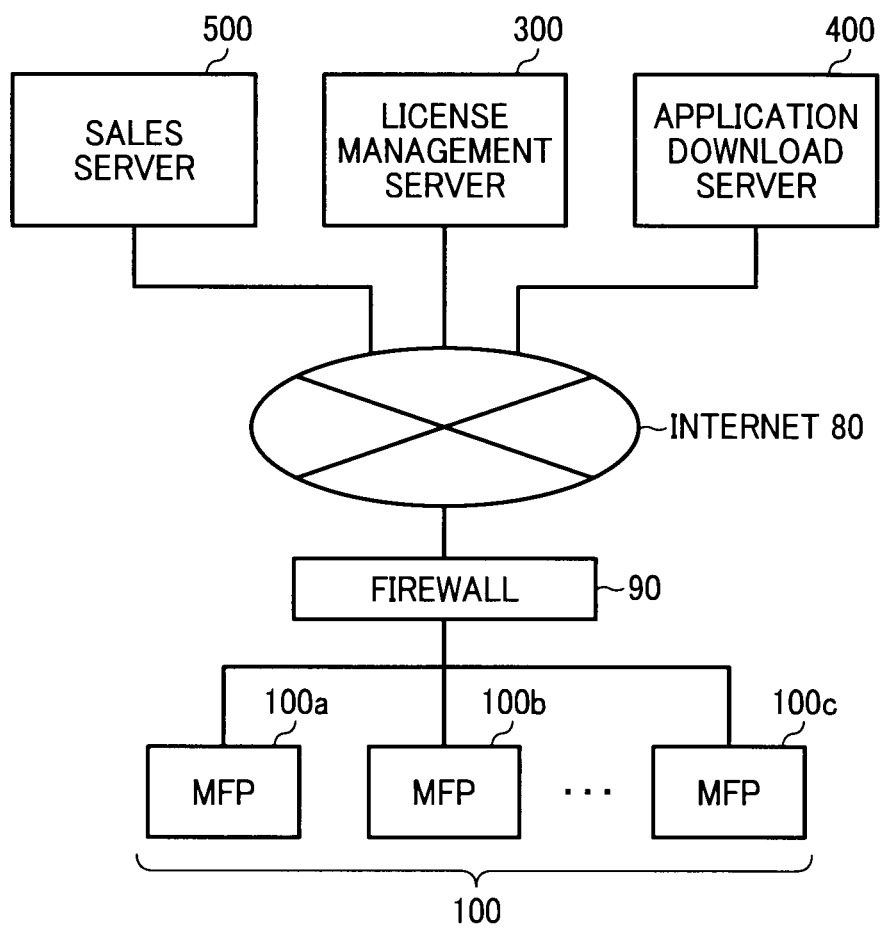
FIG. 1 is a schematic diagram illustrating a configuration of a remote management system according to an embodiment of the present invention.

First Embodiment:

FIG. 1 is a schematic diagram illustrating a configuration of a remote management system according to an embodiment of the present invention. As illustrated in FIG. 1, the remote management system includes a license management server 300, an application download server 400, a sales server 500, and a plurality of MFPs 100a, 100b, 100c (hereinafter, simply referred to as MFPs 100 when they need not be identified), which are connected to one another via a network 80 such as the Internet. A firewall 90 is provided between the MFPs 100 and the network 80.

The firewall 90 monitors data that passes through a boundary with the outside, and detects and blocks unauthorized access to prevent fraud by a third party who has intruded into the remote management system via an external network such as a public line or the Internet.

Each MFP 100 is an apparatus that has a plurality of functions of a copier, a facsimile machine, a printer, and the like, and is connected to one another via a local network such as a LAN (Local Area Network). Each MFP 100 is able to extend functions as needed by adding or updating a software component (hereinafter, simply referred to as a component). Although the three MFPs 100a, 100b, 100c are connected in the remote management system of the embodiment, the present invention is not limited to this configuration. It is possible to connect one, two, or more than four MFPs in the remote management system.

The application download server 400 is an apparatus that manages the substance of the component. More specifically, the application download server 400 is a server that provides the MFP 100 with a component for which a user makes an offer to purchase and of which license is authenticated by the license management server 300.

The license management server 300 is an apparatus that manages a license (right of use) of a component which is provided by the application download server 400 and installed in the MFP 100.

The sales server 500 is an apparatus used for performing a procedure for purchasing a component to be added to the MFP 100, or the like. The sales server 500 is installed for each sales territory for the MFP 100.

The sales server 500 receives an offer to purchase a component via a user PC (Personal Computer) or the like. The sales server 500 is a server device installed in a service center of a manufacturer or a service provider of the MFP 100 for example, and has a management database for storing various types of management data.

The management database stores therein a network equipment configuration related to an MFP which is a managing object at a customer site, and management information such as customer information and technical information, for each customer. The network equipment configuration management information is information that contains a network configuration at each customer site, a configuration of an MFP connected to the network, various types of information about the MFP such as a machine type, a machine number, a date of delivery, or installation location information, or the like, and that allows for identification of the MFP being the managing object and identification of the network configuration. The customer information is information that contains a customer name, an address, a phone number, a facsimile number, an apparatus administrator, a network administrator, or the like, and that allows for identification of a customer and his/her contact information, or more particularly, contact information to reach an apparatus administrator or a network administrator. The technical information contains a machine type, a machine number, a count value of the number of printed sheets or the number of scanned sheets, a failure code, an assumed cause, or the like, and that allows for identification of a cause and measures to some extent for a failure phenomenon that occurs in the MFP being the managing object.

In the remote management system of the embodiment, in order to realize the remote management, each apparatus is equipped with a function of transmitting and receiving a request and a response related to a process on methods for a mutually-implemented application by using RPC (Remote Procedure Call), and is allowed to use a protocol such as SOAP (Simple Object Access Protocol), HTTP (Hypertext Transfer Protocol), and FTP (File Transfer Protocol) to implement the RPC.

Described below are details of the component. The component according to the embodiment is distributed in units of so-called sales packages. A set of aggregated sales packages may be used as a unit of distribution.

A single sales package is constructed as an archive file (e.g., JAR (Java (registered trademark) Archive) containing a single sales package information file and more than one functional package. The sales package information file is a file in which attribute information of a sales package (sales package information) is recorded. The sales package information contains a product ID, a version, a name, a description, a vender name, a distribution type, and the like.

The product ID is an identifier (product identifier) uniquely assigned to each sales package and each functional package. The version is a version number of the sales package. The description is a description related to the sales package. The vender name is a name of a vender (developer) of the sales package. The name is a name of the sales package. The distribution type is information indicating necessity or unnecessity of activation (license authentication). A sales package for which the activation is not necessary is available free of charge. In the embodiment, however, a sales package for which the activation is necessary is explained below as an example.

The functional package is a software package that is packaged in functional units. A single functional package is constructed as an archive file containing a single functional package information file and the substance of a single component.

The functional package information file is a file in which attribute information of a functional package (functional package information) is recorded. The functional package information contains a product ID, a version, a name, a description, a vender name, a distribution type, and the like.

The product ID is a product ID assigned to the functional package. The version is a number of the functional package. The name is a name of the functional package. The description is a description related to the functional package. The vender name is a name of a vender (developer) of the functional package. The distribution type is information indicating necessity or unnecessity of activation of the functional package.

Figure 2:
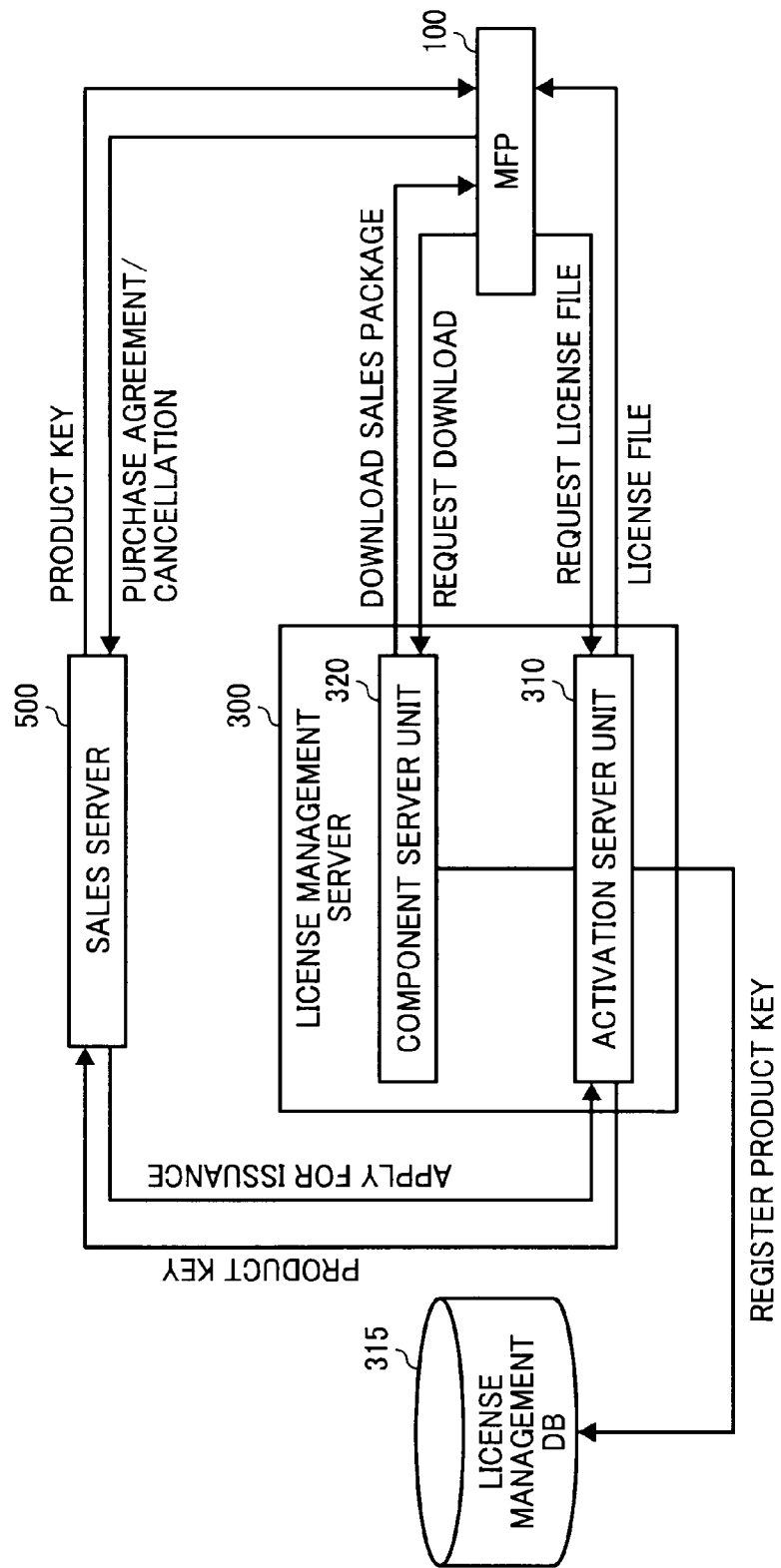
FIG. 2 is a diagram illustrating an overview of a whole process performed by a sales server, a license management server, and an MFP.

FIG. 2 is a diagram illustrating an overview of a whole process performed by the sales server 500, the license management server 300, and the MFP 100. As illustrated in the figure, the MFP 100 performs a purchase agreement or a cancellation procedure for a component with the sales server 500 via a user PC or the like. The sales server 500 specifies a product ID to apply to an activation server unit 310 of the license management server 300 to issue a license. The activation server unit 310 of the license management server 300 generates a product key, registers the generated product key in a license management DE (database) 315, and transmits the generated product key to the sales server 500. The sales server 500 transmits the received product key to the MFP 100.

The MFP 100 that has received the product key from the sales server 500 requests a license file from the activation server unit 310 of the license management server 300. The license file is a file containing license information about a sales package that is allowed to be installed in the MFP 100, and a license expiration date and a license class are contained as the license information. The activation server unit 310 of the license management server 300 transmits a license file generated by a component server unit 320 to the MFP 100.

The MFP 100 that has received the license file specifies the product ID to request downloading from the component server unit 320 of the license management server 300, and also transmits the license file to the component server unit 320 of the license management server 300. The component server unit 320 of the license management server 300 authenticates the received license file, and downloads a sales package identified by the product ID onto the MFP 100.

Figure 3:
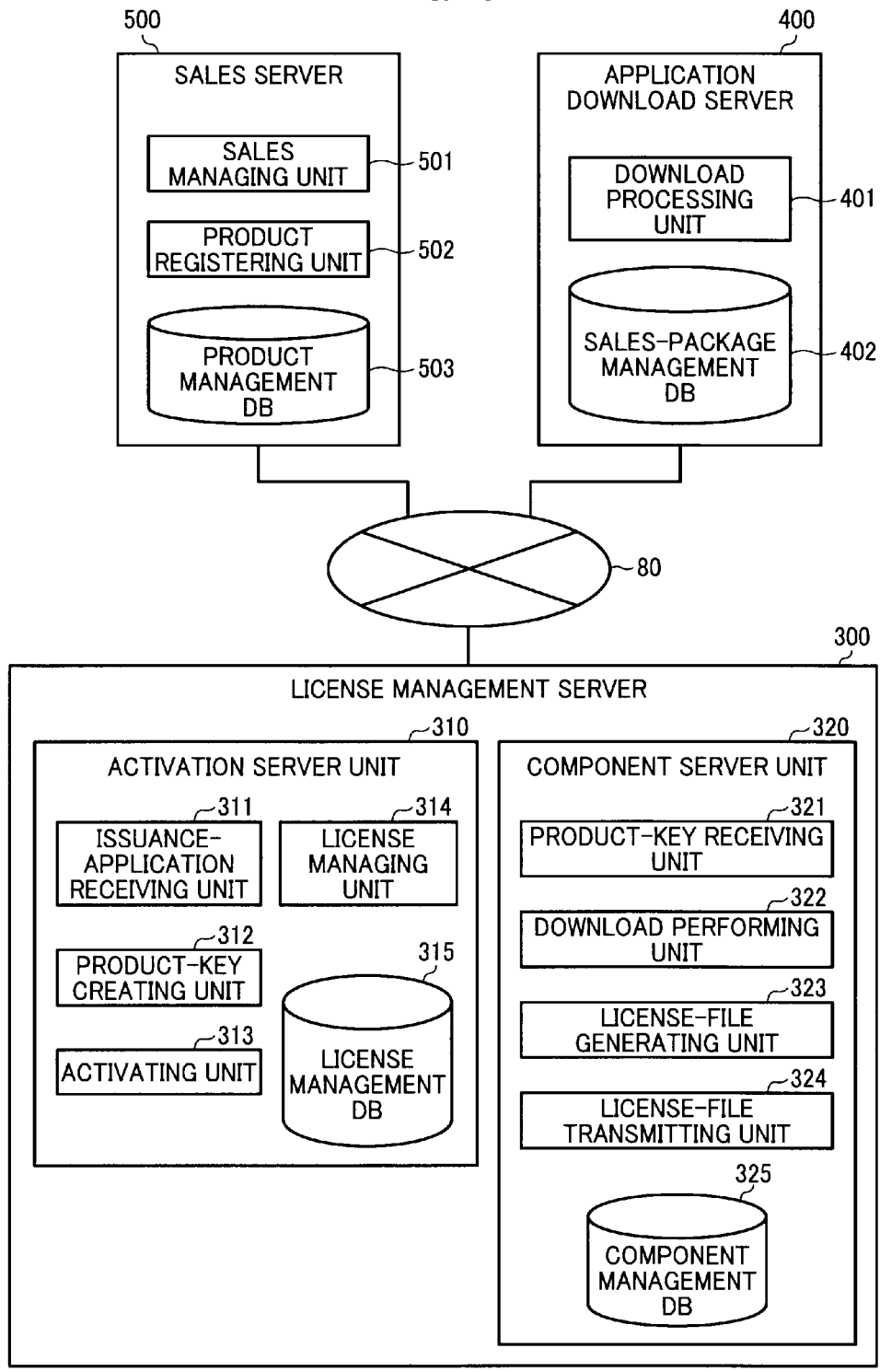
FIG. 3 is a diagram illustrating a functional configuration example of the sales server, an application download server, and the license management server according to the embodiment.

FIG. 3 is a diagram illustrating a functional configuration example of the sales server 500, the application download server 400, and the license management server 300 according to the embodiment of the present invention. The sales server 500 functions as a portal site for selling a product, and mainly includes a sales managing unit 501, a product registering unit 502, and a product management DB 503.

The sales managing unit 501 receives, from a user PC 200, an offer to purchase a product whose product information is registered in the product management DB 503. The sales managing unit 501 causes the license management server 300 to issue a product key for the product ID for which the offer to purchase is made, and transmits the product key to the MFP 100 via the user PC or the like as a response to the offer to purchase.

The product registering unit 502 downloads list information of sales packages that are centrally managed by the license management server 300, and registers in the product management DB 503 product configuration information or the like which is input based on the list information.

In the embodiment, a product is a concept composed of a sales package or a group which is identified by a product ID and license information which indicates the contents of a license. The license information is information such as a license type, a license period, the number of licenses, or the like.

The license type is explained below. FIG. 4 is a diagram illustrating examples of license types. As illustrated in FIG. 4, five license types are provided, and also classes are provided such as an official license as represented by No. 1 to No. 4 and a trial version license as represented by No. 5. The official license is a license that allows a user to buy and exercise a license (right of use) of an application. The trial version license is a license to be used by a user free of charge on a trial basis.

Furthermore, as illustrated in FIG. 4, the official license is further divided into No. 1 to No. 4. No. 1 is a "flat monthly rate agreement" that is an agreement to lend a right to use a function to a customer at a flat rate. No. 2 is a "variable rate agreement" that is an agreement to lend a right to use a function to a customer at a rate depending on usage of the function. No. 3 is a "limited-period use agreement" that is an agreement to lend a right to use a function to a customer for a predetermined period defined in the agreement. No. 4 is a "sellout agreement" that is an agreement to sell a right to use a function to a customer. On the other hand, the trial version license is an agreement to lend a right to use a function to a customer free of charge for a predetermined period, which is listed in No. 5.

Moreover, as illustrated in FIG. 4, a list on an operation display screen is divided by each agreement type. In the list on the operation display screen, an official license (auto renewal) is displayed for No. 1 "flat monthly rate agreement" and No. 2 "variable rate agreement", an official license (subscription period) is displayed for No. 3 "limited-period use agreement", an official license (no period limit) is displayed for No. 4 "sellout agreement", and a trial version license (trial) is displayed for No. 5 (trial agreement).

The product key is an identifier that is uniquely issued (or assigned) every time a product is purchased. Therefore, the product key is used as information for identifying a license of a sales package contained in the product (license identifier) or information for certifying a legitimate purchaser of the product.

The license management server 300 mainly includes the activation server unit 310 and the component server unit 320. The activation server unit 310 mainly includes an issuance-application receiving unit 311, a product-key generating unit 312, an activating unit 313, a license managing unit 314, and the license management DB 315.

The license management DB 315 stores therein a license of a sales package. More specifically, the license management DB 315 stores therein a product ID for identifying a sales package and a license corresponding to a product key of the sales package, in association with the product key.

The issuance-application receiving unit 311 receives, from the sales server 500, an application for issuance of a product key for a product ID of a predetermined sales package.

When receiving the application for issuance of the product key from the issuance-application receiving unit 311, the product-key generating unit 312 generates the product key for the product ID of the specified sales package. Upon generating the product key, the product-key generating unit 312 registers the generated product key in the license management DB 315, and transmits the product key to the sales server 500.

Upon receiving an activation request from the MFP 100, the activating unit 313 checks a license in the license management DB 315, and activates a sales package related to the activation request. The activation request is a request for authenticating a license of an application, and contains a product ID, a product key, and an apparatus ID.

When the activating unit 313 confirms that more than one license is not registered as a result of checking the license management DB 315, the activating unit 313 transmits an error indicating that the activation is not available to the MFP 100 that has transmitted the activation request.

Furthermore, when receiving a deactivation request from the MFP 100, the activating unit 313 deactivates a sales package related to the deactivation request. The deactivation request is a request for deactivating use of an application, and contains a product ID, a product key, and an apparatus ID.

More specifically, the activating unit 313 receives the product ID and the product key together with the deactivation request from the MFP 100. Then, the activating unit 313 deactivates the sales package for the MFP 100 that has transmitted the deactivation request.

When the MFP 100 is activated by the activating unit 313, the license managing unit 314 registers the apparatus ID of the activated MFP 100 in a lock code that is registered in the license management DB 315.

When the MFP 100 is deactivated by the activating unit 313, the license managing unit 314 deletes the apparatus ID of the deactivated MFP 100 from the lock code that is registered in the license management DB 315.

When receiving a change in the license type, i.e., an update of the license, from the MFP 100, the license managing unit 314 rewrites the license file in the license management DB 315 with an updated license.

The component server unit 320 mainly includes a product-key receiving unit 321, a download performing unit 322, a license-file generating unit 323, a license-file transmitting unit 324, and a component management DB 325.

The product-key receiving unit 321 receives a product key from the MFP 100 via a user PC or the like.

The download performing unit 322 downloads a sales package which is received from the application download server 400 and registered in the component management DB 325 onto the MFP 100.

The license-file generating unit 323 receives a product key from the MFP 100 via a user PC or the like, refers to the license management DB 315 to check the validity of the product key, and generates a license file when the product key is valid. More specifically, the license-file generating unit 323 compares the received product key with an issued product key which is registered in the license management DB 315 to check whether the product keys are identical or not, and determines that the received product key is valid when the product keys are identical.

The license-file transmitting unit 324 transmits the generated license file to the MFP 100.

The component management DB 325 stores therein a sales package received from the application download server 400.

The application download server 400 mainly includes a download processing unit 401 and a sales-package management DE 402.

The download processing unit 401 transfers, to the component server unit 320 of the license management server 300, a sales package identified by the product ID that is specified in the download request sent by the MFP 100, so that the sales package is transmitted to the MFP 100 via the component server unit 320 of the license management server 300.

The sales-package management DB 402 stores therein sale packages in association with product IDs for identifying the respective sales packages.

Figure 5:
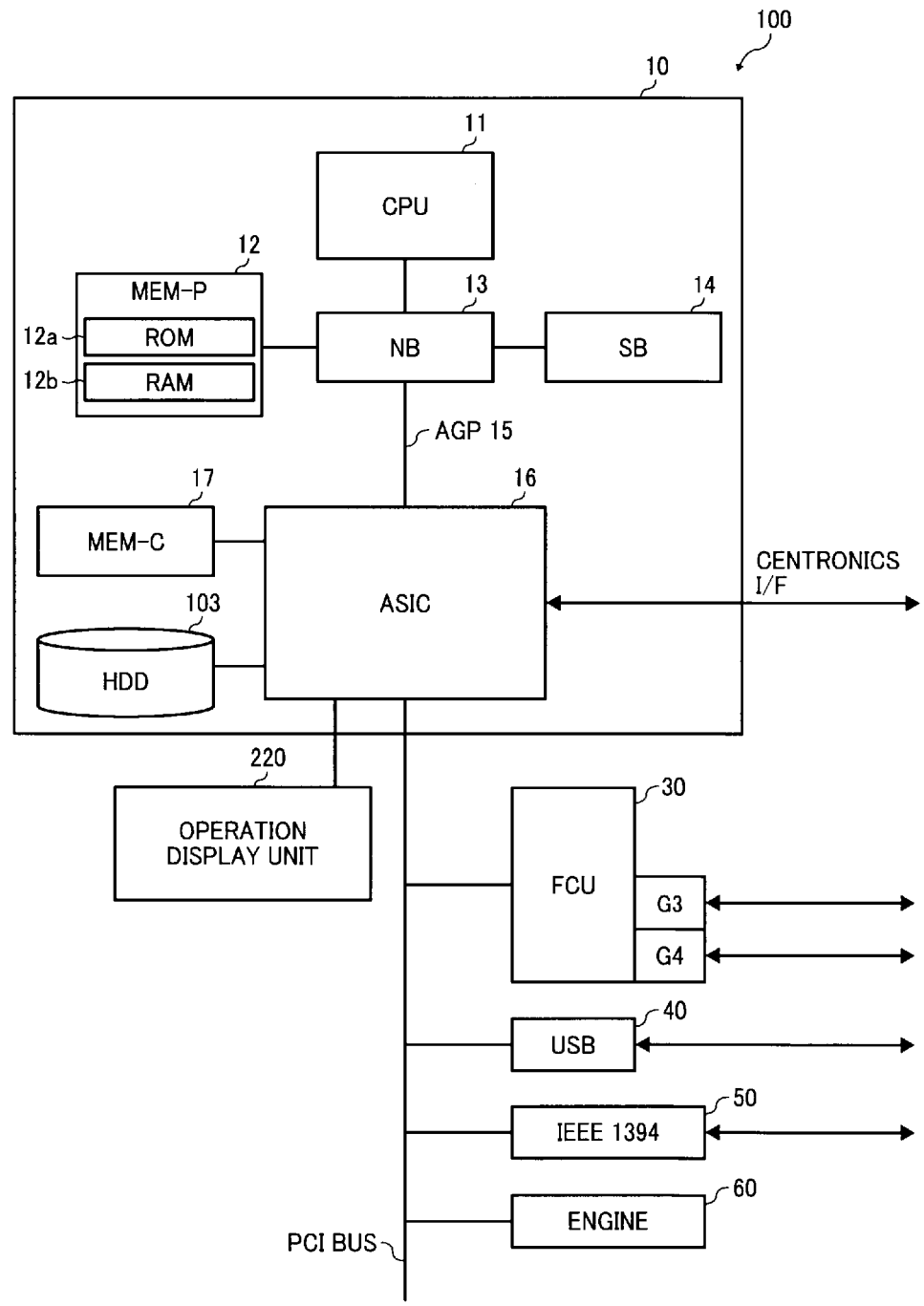
FIG. 5 is a block diagram illustrating a hardware configuration of the MFP according to the embodiment.

Described below is a hardware configuration of the MFP 100. FIG. 5 is a block diagram illustrating the hardware configuration of the MFP 100 according to the embodiment. As illustrated in the figure, the MFP 100 includes a controller 10 and an engine unit (Engine) 60 that are connected to each other with a PCI (Peripheral Component Interface) bus. The controller 10 is a controller that controls the whole MFP 100, picture processing, communications, input from an operating unit not illustrated. The engine unit 60 is a printer engine or the like that is connectable to the PCI bus. Examples of the engine unit 60 include a monochrome plotter, a one-drum color plotter, a four-drum color plotter, a scanner, and a facsimile unit. The engine unit 60 includes an image processing section that performs error diffusion, gamma conversion, and the like, in addition to what is called an engine section such as the plotter.

The controller 10 includes a CPU 11, a north bridge (NB) 13, a system memory (MEM-P) 12, a south bridge (SB) 14, a local memory (MEM-C) 17, an ASIC (Application Specific Integrated Circuit) 16, and a hard disk drive (HDD) 103. The NB 13 and the ASIC 16 are connected to each other with an AGP (Accelerated Graphics Port) bus 15. The MEM-P 12 includes a ROM (Read Only Memory) 12a and a RAM (Random Access Memory) 12b.

The CPU 11 controls the whole MFP 100, includes a chipset constructed of the NB 13, the MEM-P 12, and the SB 14, and is connected to other devices via the chipset.

The NB 13 is a bridge for connecting the CPU 11 to the MEM-P 12, the SB 14, and the AGP bus 15, and includes a memory controller, a PCI master, and an AGP target for controlling read and write from and to the MEM-P 12.

The MEM-P 12 is a system memory used as a memory for storing computer programs and data, a memory for loading computer programs and data, and a memory for use in picture processing performed by a printer or the like, and includes the ROM 12a and the RAM 12b. The ROM 12a is a read only memory used as a memory for storing computer programs and data. The RAM 12b is a writable and readable memory used as a memory for loading computer programs and data, a memory used in picture processing performed by the printer, and the like.

The SB 14 is a bridge for connecting the NB 13 to PCI devices and peripheral devices. The SB 14 is connected to the NB 13 via the PCI bus, to which a network interface (I/F) unit and the like are also connected.

The ASIC 16, which is an integrated circuit (IC) for use in image processing, includes a hardware component for the image processing, and functions as a bridge that connects the AGP bus 15, the PCI bus, the HDD 103, and the MEM-C 17 to one another. The ASIC 16 includes a PCI target and an AGP master, an arbiter (ARB) serving as the core for the ASIC 16, a memory controller that controls the MEM-C 17, a plurality of DMACs (Direct Memory Access Controllers) that control rotation of image data and the like by hardware logic or the like, and a PCI unit that performs data transfer to and from the engine unit 60 via the PCI bus. An FCU (Facsimile Control Unit) 30, a USB (Universal Serial Bus) 40, and an IEEE 1394 (the Institute of Electrical and Electronics Engineers 1394) interface 50 are connected to the ASIC 16 via the PCI bus. An operation display unit 220 is directly connected to the ASIC 16.

The MEM-C 17 is a local memory used as a copy image buffer and a code buffer.

The HDD 103 is a storage for storing image data, computer programs, font data, and forms. The HDD 103 also stores therein a license file of an application to be executed by the MFP 100.

The AGP bus 15 is a bus interface for a graphics accelerator card introduced to speed up graphics operation and allows direct access to the MEM-P 12 with a high throughput, thereby speeding up operation related to the graphic accelerator card.

Figure 6:
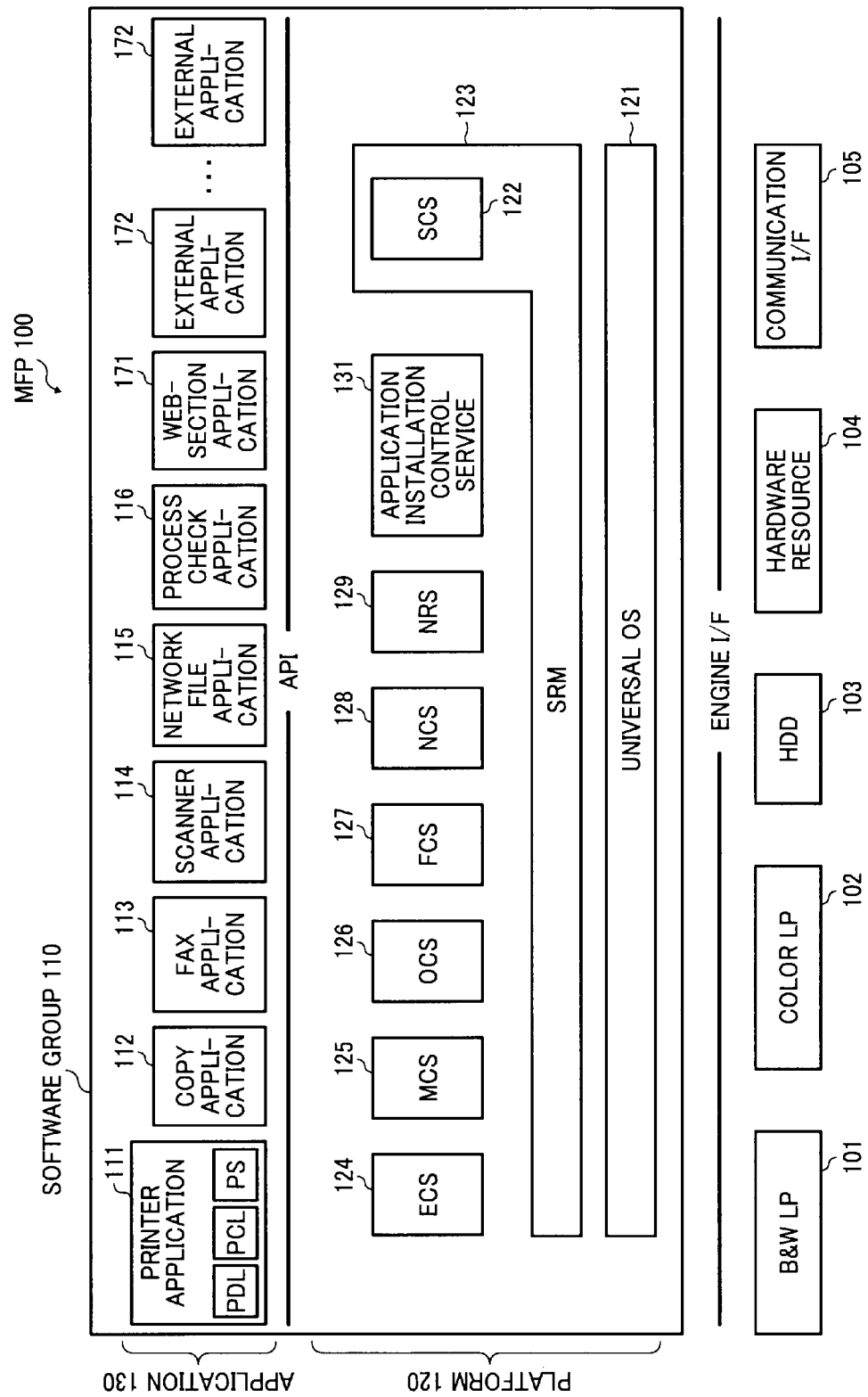
FIG. 6 is a block diagram illustrating a software configuration diagram of the MFP according to the embodiment.

Described below is a software configuration of the MFP 100. FIG. 6 is a block diagram illustrating a software configuration diagram of the MFP 100 according to the embodiment. As illustrated in the figure, the MFP 100 includes a black and white laser printer (B-and-W LP) 101, a color laser printer (color LP) 102, the HDD 103, a hardware resource 104 such as a scanner, a facsimile machine, or a memory, a communication I/F (interface) 105, and a software group 110 constructed of a platform 120 and an application 130.

In the MFP 100 of the embodiment, the HDD 103 stores therein an application, a license file of the application, and an apparatus ID as identification information unique to the MFP 100.

The platform 120 includes a control service that interprets a process request from the application 130 and issues an acquisition request for a hardware resource, a system resource manager (SRM) 123 that manages a single or a plurality of hardware resources and arbitrates the acquisition request from the control service, and a universal OS 121.

The control service is formed of a plurality of service modules, and includes an SCS (system control service) 122, an ECS (engine control service) 124, an MCS (memory control service) 125, an OCS (operation-panel control service) 126, an FCS (facsimile control service) 127, an NCS (network control service) 128, an NRS (new remote service) 129, and an application installation control service 131. The platform 120 also includes an application programming interface (API) that allows for reception of a process request from the application 130 by using a predetermined function.

The universal OS 121 is a universal operating system for UNIX (registered trademark) or the like, and executes each software of the platform 120 and the application 130 in parallel as a process.

A process of the SRM 123 performs system control and resource management in cooperation with the SCS 122. The process of the SRM 123 performs arbitration and controls execution according to a request from a higher layer that uses a hardware resource such as an engine for a scanner unit or a printer unit, a memory, an HDD file, and a host I/O (e.g., a centronics I/F, a network I/F, an IEEE 1394 I/F, or an RS232C I/F).

More specifically, the SRM 123 determines whether a requested hardware resource is available (i.e., whether the hardware resource is not used by other requests), and when the hardware resource is available, notifies the higher layer of the fact that the requested hardware is available. Furthermore, the SRM 123 performs scheduling of use of hardware resources by a request from the higher layer, and directly executes the contents of the request (e.g., paper conveyance and image formation by a printer engine, memory allocation, file generation, or the like).

A process of the SCS 122 runs for application management, control of an operating unit, displaying of a system screen, displaying by an LED, resource management, interruption application control, or the like.

A process of the ECS 124 runs for control of engines of the B-and-W LP 101, the color LP 102, or the hardware resource 104 formed of the scanner, a facsimile, and the like.

A process of the MCS 125 runs for acquisition and release of an image memory, use of a hard disk drive (HDD), compression and extension of image data, or the like.

A process of the FCS 127 provides an API for performing facsimile transmission and reception from each application layer of a system controller by using a PSTN/ISDN network, registration and extraction of various types of facsimile data managed by a BKM (backup SRAM), read of facsimiles, reception and printing of facsimiles, or integrated transmission and reception.

A process of the NCS 128 is a process for providing a service which is available for all applications that need an network I/O, and performs sorting of data received from a network side through each protocol into each application or arbitration for transmitting data from an application to the network side.

A process of the OCS 126 runs for control of an operation panel that functions as an information conveying means between an operator (user) and a main-body control side. The OCS 126 is constructed of an OCS process section, which receives a key pressing operation (or a touch operation) as a key event from the operation panel and transmits a key event function corresponding to the received key to the SCS 122, and an OCS library section, in which a drawing function for drawing and outputting various screens on the operation panel according to a request from the application 130 or the control service or a function for performing other control on the operation panel is registered in advance. The OCS library is implemented with link with the modules of the application 130 and the control service. The OCS 126 may be configured so that the whole thereof is operated as a process, or the whole thereof functions as the library.

The application installation control service 131 performs control to install an application in the MFP 100. Details are explained below.

The application 130 includes a printer application 111 which is an application for a printer and has a page description language (PDL), a PCL, and a post script (PS), a copy application 112 as an application for copying, a fax application 113 as an application for handling facsimiles, a scanner application 114 as an application for scanning, a network file application 115 as an application for handling a network file, a process check application 116 as an application for checking a process, and an WEB-section application 171 which operates as an WEB server (http server) for a client terminal such as a PC connected to the Internet and displays various screens on a WEB browser that runs on the client terminal.

Each process of the application 130 and each process of the control service realize a user service related to an image forming process performed by a copier, a printer, a scanner, a facsimile machine, or the like, while performing inter-process communications by function call, transmission of return values, and transmission and reception of messages.

In this manner, the MFP 100 according to the first embodiment includes a plurality of the applications 130 and a plurality of the control services, and each of the applications 130 and the control services is run as a process. Furthermore, in each process, a single or a plurality of threads is generated and parallel execution is performed in units of threads. Moreover, the control services provide a common service to the applications 130. Therefore, while a large number of the processes are executed in parallel and the threads are also executed in parallel so as to perform inter-process communications with each other in a cooperative manner, a user service related to the image forming process performed by a copier, a printer, a scanner, a facsimile machine, or the like is provided.

Furthermore, the MFP 100 is configured to allow external applications A, B, . . . (hereinafter, simply referred to as external applications 172 when they need not be identified) to be developed and mounted on an application layer above a control service layer by a third party such as a customer of the MFP 100 or a third vender. The external applications 172 can be installed via a network.

In the MFP 100 according to the first embodiment, the processes of the plurality of applications 130 and the processes of the plurality of control services are run. However, it is possible to construct each process of the applications 130 and the control services to have a unitary structure. Furthermore, each application 130 allows addition and deletion of each application. In other words, as described above, it is possible to install or uninstall the external applications 172.

Described in detail below is the application installation control service 131. FIG. 7 is a diagram for explaining functions of the application installation control service 131. As illustrated in FIG. 7, the application installation control service 131 mainly includes an installing unit 132, a detecting unit 133, a class identifying unit 134, an update-process determining unit 135, an update requesting unit 136, a license-file acquiring unit 137, a replacing unit 138, a display control unit 139, and a communication control unit 140.

The installing unit 132 installs an application contained in a sales package downloaded from the application download server 400 or the component server unit 320 of the license management server 300.

The detecting unit 133 acquires an expiration date of a license from a license file stored in the HDD 103, and checks whether a current license is expired or not based on the expiration date to detect expiration. More specifically, the detecting unit 133 detects the expiration by acquiring current time and comparing the current time with the acquired expiration date.

The class identifying unit 134 identifies a class of a license based on the license file stored in the HDD 103. More specifically, the class identifying unit 134 identifies a type of the license from among the license types No. 1 to No. 5 illustrated in FIG. 4, and then determines whether the identified type corresponds to the official license class or the trial version license class.

The update-process determining unit 135 determines a method of updating a license which is detected as being expired by the detecting unit 133, based on the class identified by the class identifying unit 134. More specifically, when the license is detected as being expired and is identified to be the trial version license, the update-process determining unit 135 determines to employ a method of updating the trial version license stored in the HDD 103 to the official license. Furthermore, when the license is detected as being expired and is identified to be the official license, the update-process determining unit 135 determines to employ the method of updating the license with normal input of a product key.

The update requesting unit 136 transmits an update request to the component server unit 320 of the license management server 300 via the communication control unit 140. More specifically, the update requesting unit 136 transmits a request file to the component server unit 320 of the license management server 300.

The request file contains an apparatus ID and a product key. FIG. 8 is a diagram illustrating an example of the request file. As illustrated in FIG. 8, details of a license issuance request, a product key, a machine type of the MFP 100, a serial number of the MFP 100, the apparatus ID, and the like are written in the request file.

Figure 9:
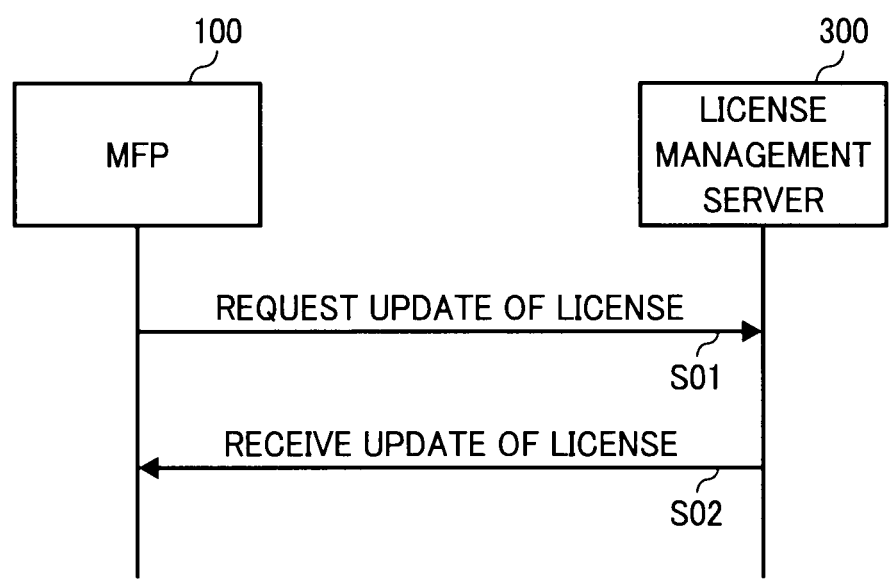
FIG. 9 is a flowchart of an update start process performed by the MFP and the license management server.

The license-file acquiring unit 137 receives a license file from the activation server unit 310 of the license management server 300. An update start process performed by the MFP 100 and the license management server 300 is explained below. FIG. 9 is a sequence diagram of the update start process performed by the MFP 100 and the license management server 300. As illustrated in FIG. 9, the MFP 100 transmits the request file to thereby transmit a license update request to the license management server 300 (Step S01). The license management server 300 transmits a license file to the MFP 100 to thereby accept the update of the license (Step S02).

The replacing unit 138 replaces the license file stored in the HDD 103 with the license file acquired by the license-file acquiring unit 137.

The display control unit 139 displays a screen of a list of licenses, an operation screen for allowing a user to preform operation or input, an execution screen for indicating a progress of the update process, or the like on the operation display unit 220. Furthermore, the display control unit 139 displays a screen of the updated list of licenses after the update process is completed.

The communication control unit 140 controls communication between the MFP 100 and the license management server 300. For example, the communication control unit 140 transmits a request file for the update request to the license management server 300 or receives a license file from the license management server 300.

Figure 10:
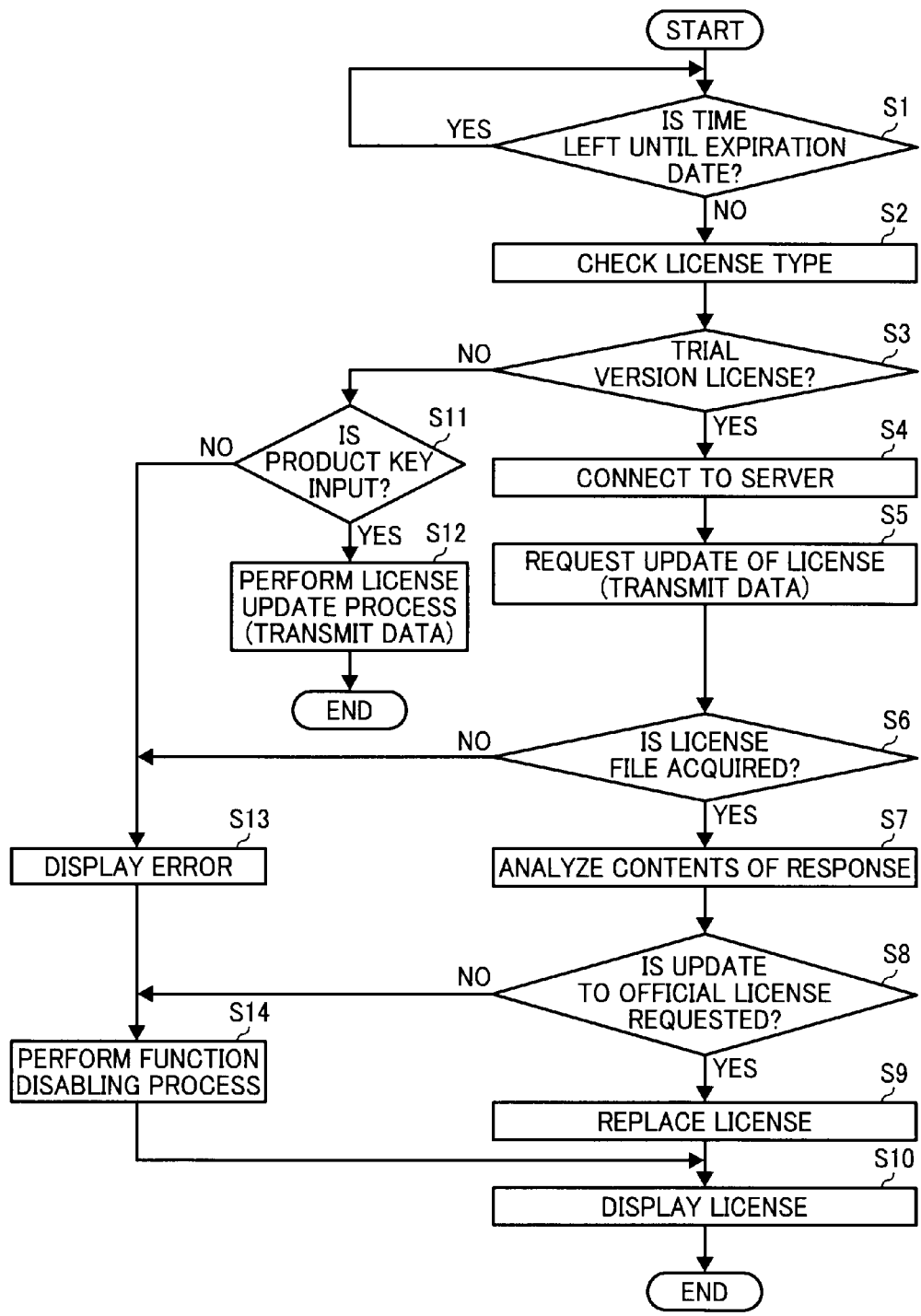
FIG. 10 is a flowchart of a procedure of a process of updating a trial version license to an official license.

Described below is a procedure of a process of updating a trial version license to an official license. FIG. 10 is a flowchart of the procedure of the process of updating the trial version license to the official license.

The detecting unit 133 acquires an expiration date contained in the license file stored in the HDD 103, and checks whether time is left until the expiration date of the license or not to detect expiration (Step S1). When the expiration is detected (NO at Step S1), the class identifying unit 134 refers to the HDD 103 to identify a class contained in the stored license file (Step S2).

Figure 11:
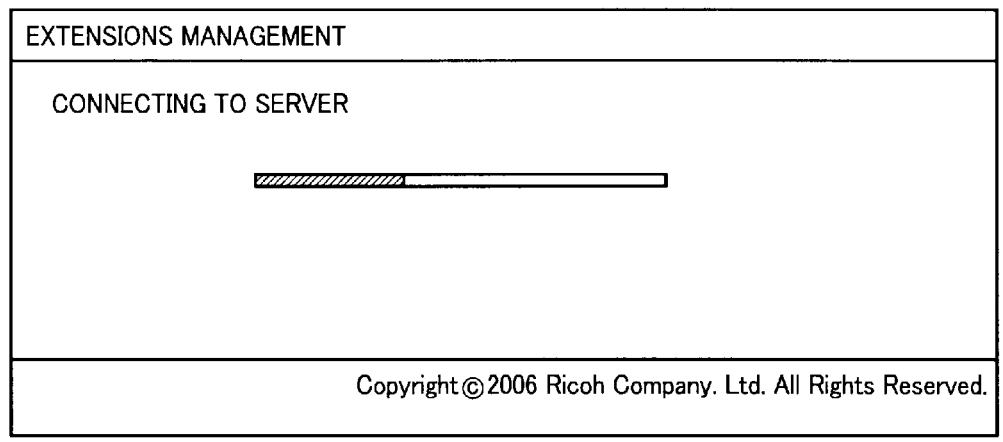
FIG. 11 is a diagram illustrating an example of a screen for indicating a server connecting state.
Figure 12:
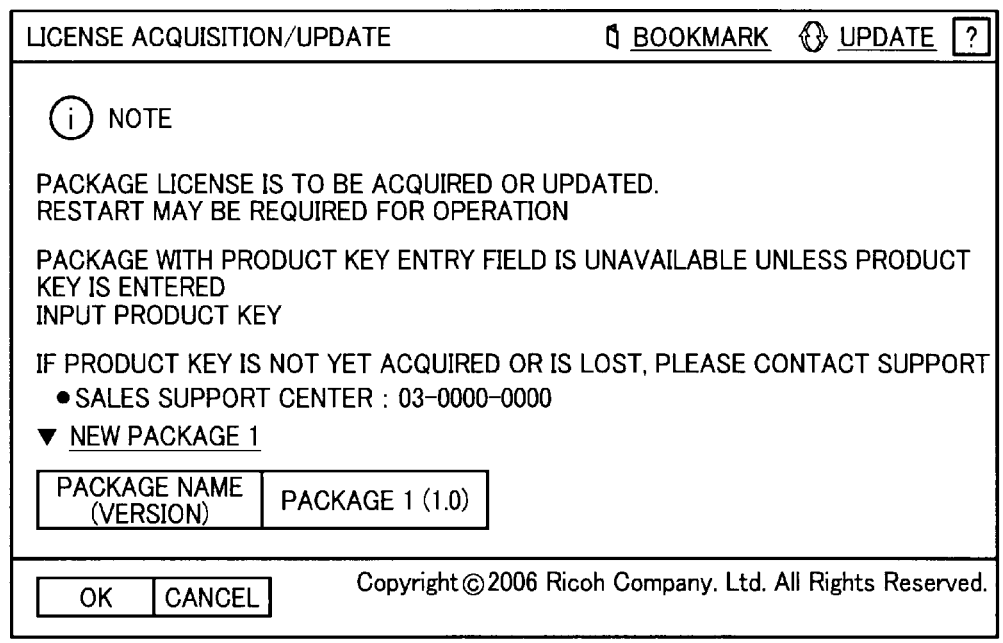
FIG. 12 is a diagram illustrating an example of a screen for indicating a license acquiring and updating state.

The update-process determining unit 135 checks whether the identified class of the license corresponds to a trial version license or not (Step S3). When the class corresponds to the trial version license (YES at Step S3), the update-process determining unit 135 determines to employ a process of updating the trial version license to the official license, and the update requesting unit 136 makes a connection to a server via the communication control unit 140 (Step S4). At this time, the display control unit 139 displays a screen for indicating a server connecting state on the operation display unit 220. FIG. 12 is a diagram illustrating an example of the screen for indicating the server connecting state. As illustrated in FIG. 11, the display control unit 139 displays a screen for notifying that a connection to the server is currently being performed.

The update requesting unit 136 transmits a license update request to the license management server 300 (Step S5). At this time, the update requesting unit 136 transmits a request file to the license management server 300. In this case, the display control unit 139 displays a screen for indicating a license acquiring and updating state on the operation display unit 220. FIG. 12 is a diagram illustrating an example of the screen for indicating the license acquiring and updating state. As illustrated in FIG. 12, the display control unit 139 displays a screen for notifying that the license is currently being acquired and updated.

The replacing unit 138 checks whether a license file is acquired from the license management server 300 by the license-file acquiring unit 137 (Step S6). When confirming that the license file is acquired (YES at Step S6), the replacing unit 138 analyzes the contents of the response (Step S7). More specifically, an expiration date or a class of the license is acquired from the acquired license file based on the response by the license management server 300.

After the check, it is further checked whether a class contained in the acquired license file corresponds to an official license or not (Step S8). When the class corresponds to the official license (YES at Step S8), the replacing unit 138 replaces the license file stored in the HDD 103 with the acquired license file of the official license (Step S9). FIG. 14 illustrates a screen for indicating a license-update executing state. As illustrated in FIG. 14, the display control unit 139 displays a screen for notifying that the update of the license is being executed on the operation screen.

At Step S3, when the class of the license does not correspond to the trial version license as a result of the check by the update-process determining unit 135 (NO at Step S3), the display control unit 139 displays a screen for inputting a product key, and waits for input of a product key (Step S11). At this time, the display control unit 139 displays a screen for inputting a product key on the operation display unit 220. FIG. 13 is a diagram illustrating an example of the product-key input screen. As illustrated in FIG. 13, the display control unit 139 displays the product-key input screen for receiving input of a product key from a user.

When confirming that a product key is input (YES at Step S11), the update requesting unit 136 transmits an update request to the license management server 300 (Step S12). At this time, the update requesting unit 136 transmits a request file to the license management server 300. In this case, similarly to the process at Step S5, the display control unit 139 displays the license acquiring and updating screen as illustrated in FIG. 12 on the operation display unit 220. Consequently, the update process is performed in a conventionally-known manner.

At Step S11, when the input of the product key is not confirmed (NO at Step S11), the display control unit 139 displays an error on the operation display unit 220 (Step S13). The installing unit 132 invalidates the license and disables functions of an application of the invalidated license (Step S14). Similarly, also in the case in which the class of the license of the acquired license file does not correspond to the official license at Step S8 (NO at Step S8), the installing unit 132 invalidates the license and disables functions of the application of the invalidated license (Step S14).

At. Step S10, the display control unit 139 displays a screen for indicating a result of the update or the invalidation process on the operation display unit 220 (Step S10). FIG. 15 is a diagram illustrating an example of a list screen displayed after the update or the invalidation process. When the license file is replaced at Step S9 or when the license invalidation process is performed at Step S14, the display control unit 139 displays a screen of a list obtained after the update or the invalidation process on the operation display unit 220 as illustrated in FIG. 15. More specifically, as illustrated in FIG. 15, a vender name, a license type, an expiration date, and a status are displayed in association with a name of a version of the application package. Furthermore, a check box for checking a processed item is associated with each record. In FIG. 15, an example is illustrated in which a package 1, a package 2, and a package 3 are processed this time.

At this time, the display control unit 139 displays the license type in the list screen so as to enable to distinguish whether the license is changed to the trial version license or the license is initially the trial version license.

As described above, according to the embodiment, it is possible to change the type of a license at the time of automatic update. Therefore, it is possible to enhance convenience.

Second Embodiment:

In the first embodiment, when the trial version license is expired, the trial version license is updated to the official license. In contrast, in a second embodiment of the present invention, when the official license is expired and is not yet updated, the official license is updated to the trial version license.

FIG. 16 is a software configuration diagram of an MFP 600 according to the embodiment. As illustrated in the figure, the MFP 600 includes the B-and-W LP 101, the color LP 102, the HDD 103, the hardware resource 104 such as a scanner, a facsimile machine, and a memory, the communication I/F 105, and the software group 110 constructed of the platform 120 and the application 130. The details of the above components are the same as those of the first embodiment, and therefore, explanation thereof is not repeated.

An application installation control service 231 performs control to install an application in the MFP 600. Details are explained below.

Figure 17:
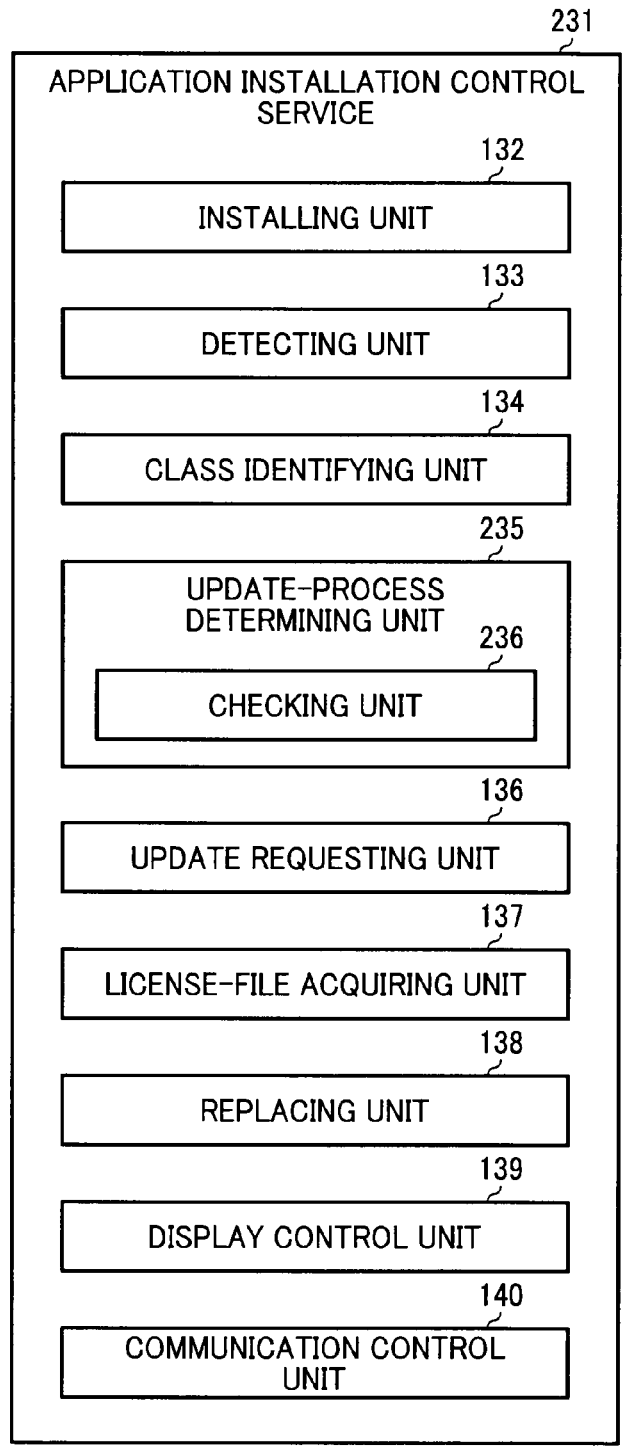
FIG. 17 is a functional configuration diagram of an application installation control service.

The application installation control service 231 included in the MFP 600 according to the embodiment is explained below. FIG. 17 is a functional configuration diagram of the application installation control service 231. As illustrated in FIG. 17, the application installation control service 231 mainly includes the installing unit 132, the detecting unit 133, the class identifying unit 134, an update-process determining unit 235, the update requesting unit 136, the license-file acquiring unit 137, the replacing unit 138, the display control unit 139, and the communication control unit 140.

Functions and a configuration of the update-process determining unit 235 are explained below. The functions and the configurations of the components other than the update-process determining unit 235 are the same as the components denoted by the same reference symbols in the functional configuration of the application installation control service 131 of the first embodiment as illustrated in FIG. 7, and therefore, explanation thereof is not repeated.

The update-process determining unit 235 includes a checking unit 236, and determines a method of updating a license which is detected as being expired by the detecting unit 133, based on a class identified by the class identifying unit 134 and a result of the check performed by the checking unit 236.

The checking unit 236 checks with the license management server 300 whether a license update procedure has been completed by a user or not when the class identified by the class identifying unit 134 corresponds to the official license.

More specifically, when the checking unit 236 confirms that a user has completed the update procedure for the official license which is detected as being expired, the update-process determining unit 235 determines to employ a conventionally-known update process by the update procedure.

On the other hand, when it is not confirmed that the user has completed the update procedure, the update-process determining unit 235 determines to employ a process of updating the official license to the trial version license. In this update process, the license file of the official license stored in the HDD 103 is replaced with a license file of the trial version license.

Figure 18A:
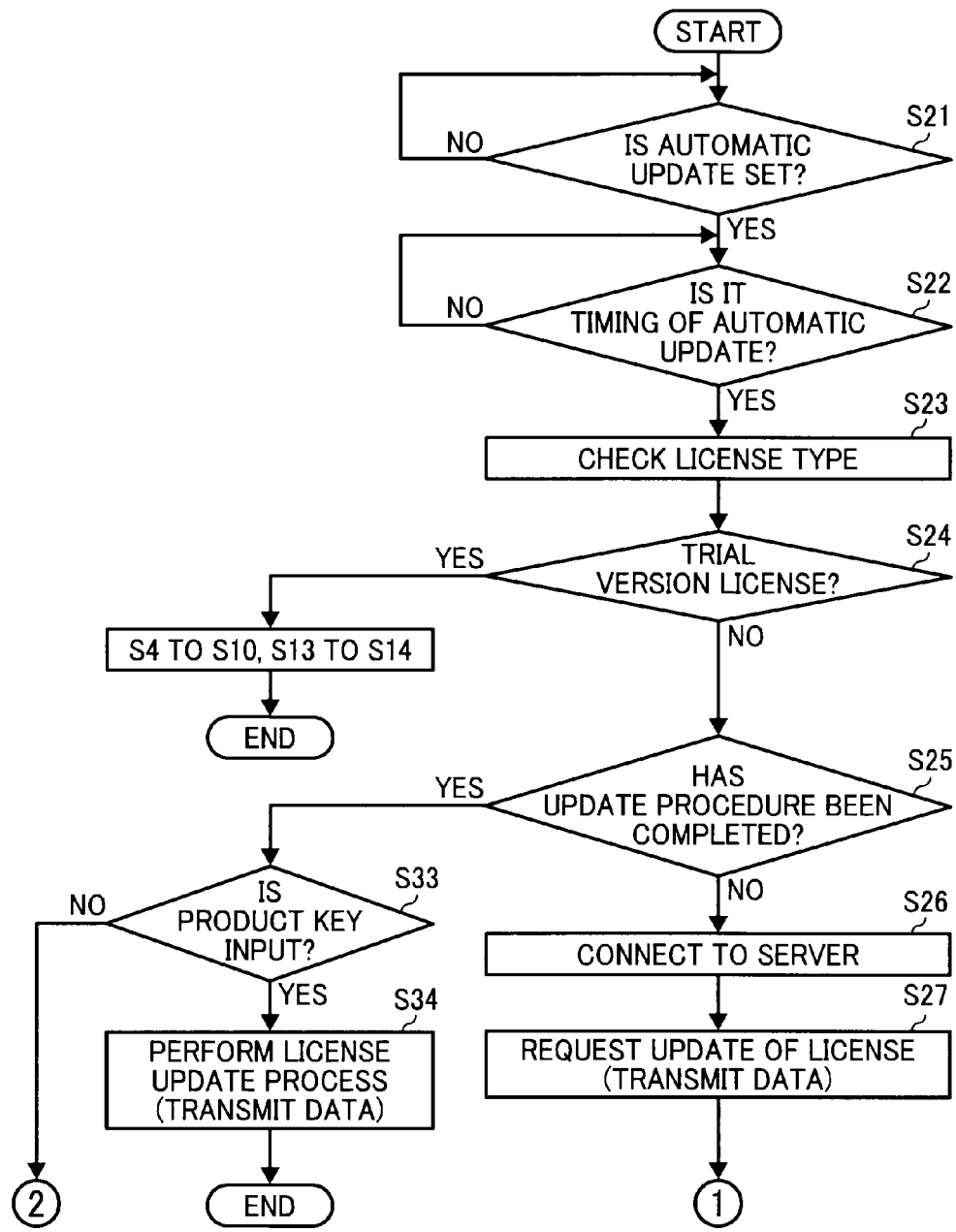
FIG. 18 is a flowchart of a procedure of a process of updating an expired official license to a trial version license.
Figure 18B:
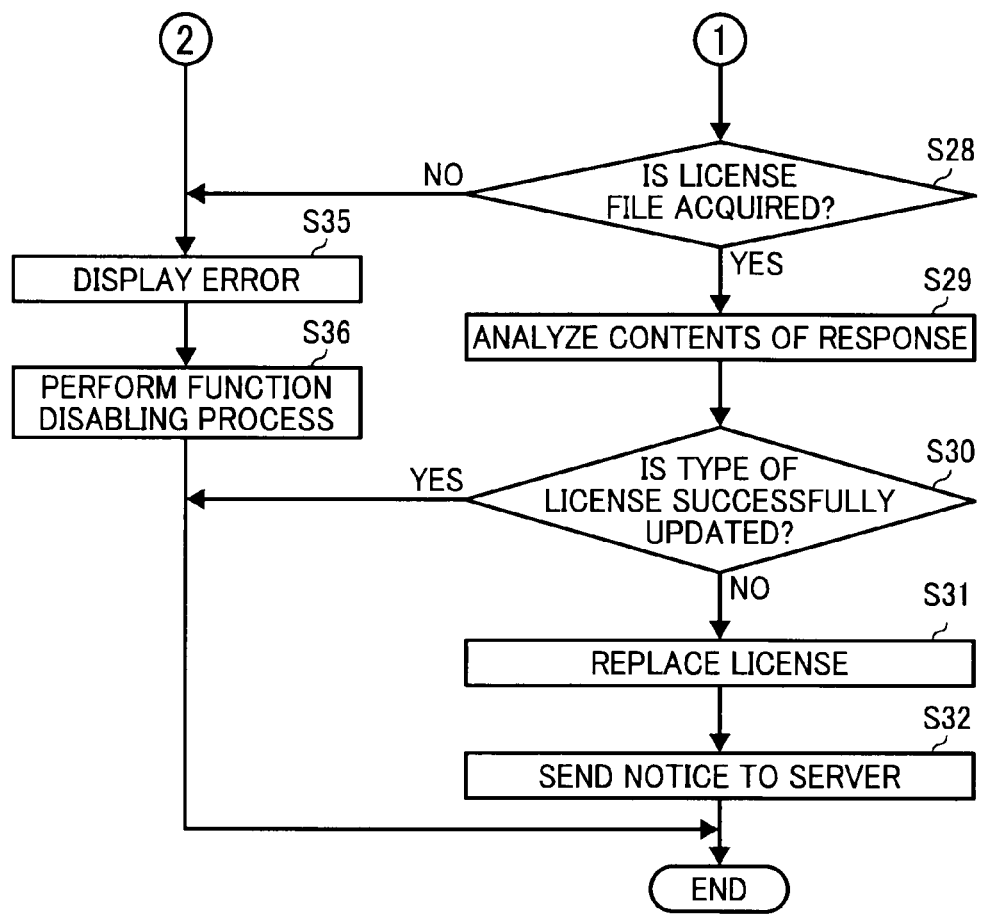

Described below is a procedure of a process of updating the expired official license to the trial version license. FIG. 18 is a flowchart of the procedure of the process of updating the expired official license to the trial version license.

The detecting unit 133 checks whether a setting unit (not shown) has set automatic update of a license (Step S21). When confirming that the automatic update is set (YES at Step S21), the detecting unit 133 checks whether current time coincides with the timing of the automatic update or not (Step S22). More specifically, the detecting unit 133 acquires the expiration date contained in the license file stored in the HDD 103 and the current time, and checks whether the current time coincides with the expiration date.

When it is confirmed that the current time coincides with the timing of the automatic update (YES at Step S22), the class identifying unit 134 identifies a class of the license based on the license file stored in the HDD 103 (Step S23). The update-process determining unit 235 checks whether the identified class of the license corresponds to a trial version license or not (Step S24).

When the update-process determining unit 235 determines that the class corresponds to the official license (NO at Step S24), the checking unit 236 checks with the license management server 300 whether the user has completed the update procedure or not (Step S25).

When it is not confirmed that the user has completed the update procedure (NO at Step S25), the update-process determining unit 235 determines to employ the update process of updating the official license to the trial version license, and the update requesting unit 136 makes a server connection via the communication control unit 140 (Step S26). At this time, the display control unit 139 displays a screen for indicating a server connecting state as illustrated in FIG. 11 on the operation display unit 220. The processes from Step S26 to Step S29 are the same as those at Step S4 to Step S7 of the flowchart of the update process according to the first embodiment, and therefore, explanation thereof is not repeated.

On the other hand, when it is confirmed that the user has completed the update procedure (YES at Step S25), the update-process determining unit 235 determines to employ a conventionally-known update process (Step S34). The processes at Step S33 to Step S36 are the same as those at Step S11 to Step S14 of the flowchart of the update process according to the first embodiment, and therefore, explanation thereof is not repeated.

At Step S24, when it is determined that the class corresponds to the trial version license (YES at Step S24), the update-process determining unit 235 determines to employ the update process by the processes at Step 4 to Step 10 and at Step 13 to Step 14 in FIG. 10 of the first embodiment.

The processes at Step S28 to Step S30 are the same as those at Step S6 to Step S8 of the flowchart of the update process according to the first embodiment, and therefore, explanation thereof is not repeated.

At Step S30, the license-file acquiring unit 137 checks whether the type of the license is successfully updated or not (Step S30). More specifically, the license-file acquiring unit 137 checks whether a trial version license is acquired from the license management server 300 or not.

When the license-file acquiring unit 137 acquires the license file of the trial version license (YES at Step S30), the replacing unit 138 replaces the license file stored in the HDD 103 with the license file of the trial version license acquired by the license-file acquiring unit 137 (Step S31).

When replacing the license file with the license file of the trial version license, the replacing unit 138 notifies the license management server 300 of success in replacing the license via the communication control unit 140 (Step S32). At this time, the display control unit 139 displays a screen of a list obtained after the update on the operation display unit 220.

As another example, even when the class contained in the license file stored in the HDD 103 corresponds to the trial version license, it is possible to update the license to a new trial version license.

In this case, at Step S25, the checking unit 236 checks with the license management server 300 whether the update to the official license has been requested and the update procedure has been completed or not (Step S25). More specifically, the checking unit 236 confirms that the license management server 300 has received the update request with an offer to purchase the official license from a user of the trial version license but the update procedure such as fee payment or the like has not been completed.

Furthermore, at Step S28, the license-file acquiring unit 137 acquires a license file of a trial version license for which the expiration date is set to another three months. Therefore, it is possible to automatically extend the trial period of the trial version license for three months.

Consequently, even when the trial version license is originally to be expired after issuance of the update request with purchase of the official license by a user and before completion of the update procedure, it is possible to allow continuous use of the trial version license.

As described above, according to the embodiment, it is possible to change the type of a license at the time of automatic update. Therefore, it is possible to reduce the operation procedure of the license update process and enhance the convenience.

Furthermore, according to the embodiment, even when a user of an official license leaves the update procedure unprocessed while the user requests continuous use of the license, it is possible to allow for continuous use of the license by automatically changing the license to the trial version license as tentative measures.

Third Embodiment:

In the first and the second embodiments, the update process is started upon automatically detecting expiration of a license. In contrast, according to a third embodiment of the present invention, the update process is started upon receiving an update request that is issued for an official license which has manually been deactivated by a user, and that is manually input by the user. In the embodiment, an example is explained in which the update process is performed for a license which is once deactivated and then reactivated by a user while the license remains unexpired.

The configuration of a remote management system and the hardware configuration of an MFP 700 according to the embodiment are the same as those of the first embodiment, and therefore, explanation thereof is not repeated.

Figure 19:
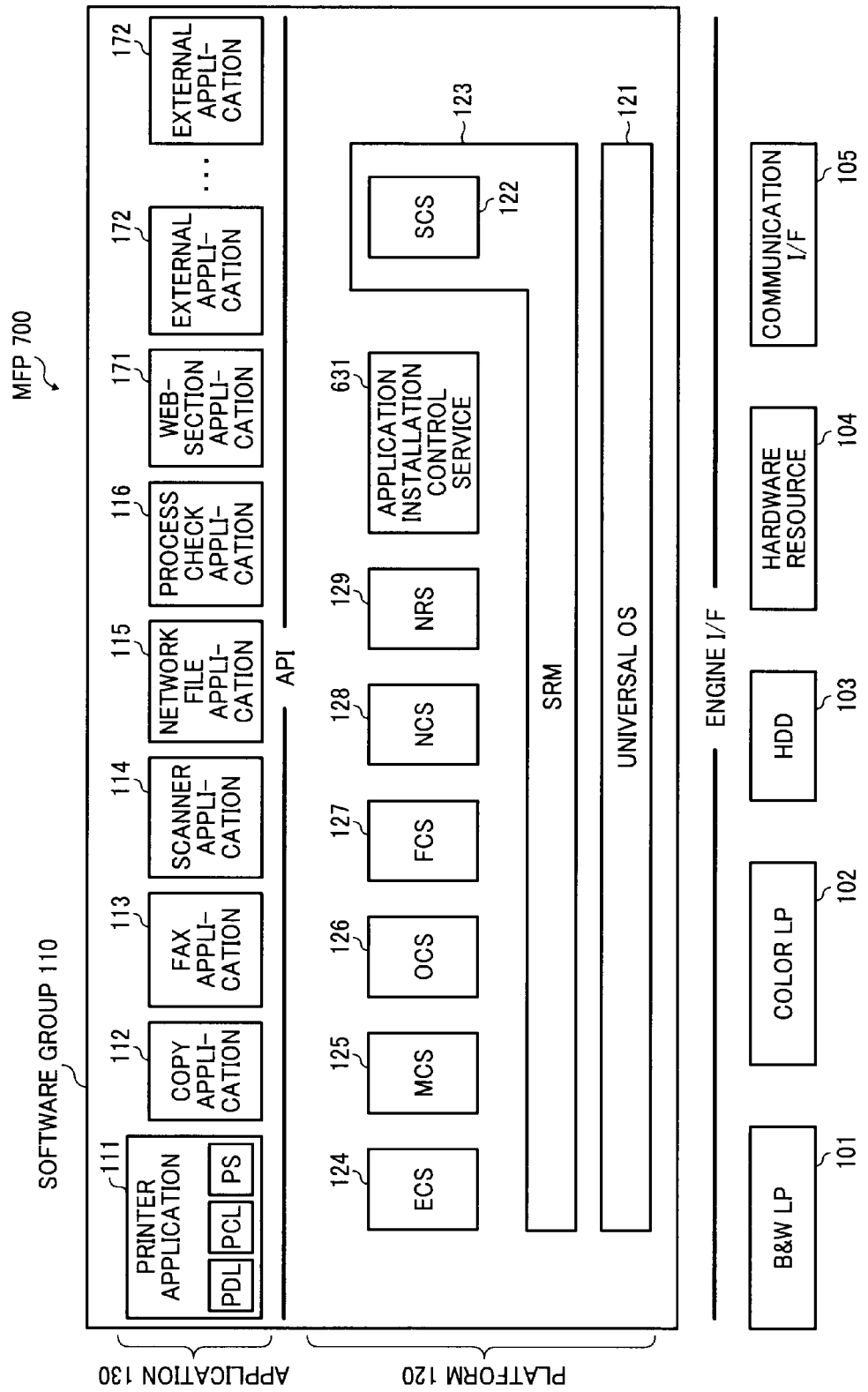
FIG. 19 is a software configuration diagram of an MFP according to still another embodiment.

FIG. 19 is a software configuration diagram of the MFP 700 according to the embodiment. As illustrated in FIG. 19, the MFP 700 includes the B-and-W LP 101, the color LP 102, the HDD 103, the hardware resource 104 such as a scanner, a facsimile machine, and a memory, the communication I/F 105, and the software group 110 constructed of the platform 120 and the application 130. The details of the above components are the same as those of the first embodiment, and therefore, explanation thereof is not repeated.

An application installation control service 631 performs control to install an application in the MFP 700. Details are explained below.

Figure 20:
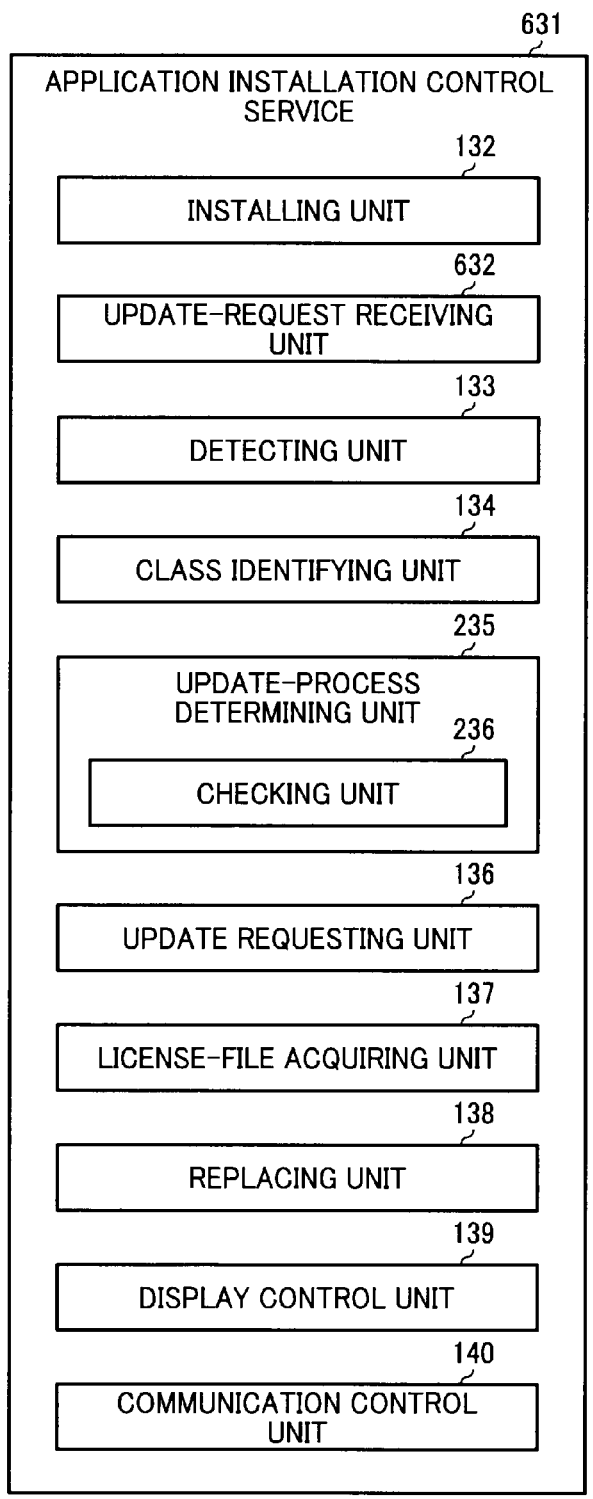
FIG. 20 is a functional configuration diagram of an application installation control service.

The application installation control service 631 included in the MFP 700 of the embodiment is explained below. FIG. 20 is a functional configuration diagram of the application installation control service 631. As illustrated in FIG. 20, the application installation control service 631 mainly includes the installing unit 132, an update-request receiving unit 632, the detecting unit 133, the class identifying unit 134, the update-process determining unit 235, the update requesting unit 136, the license-file acquiring unit 137, the replacing unit 138, the display control unit 139, and the communication control unit 140.

Functions and a configuration of the update-request receiving unit 632 are explained below. The functions and the configurations of the above components other than the update-request receiving unit 632 are the same as the components denoted by the same reference symbol in the functional configuration diagram of the application installation control service 131 and 231 of the first and second embodiments as illustrated in FIG. 7 and FIG. 17, and therefore, explanation thereof is not repeated.

The update-request receiving unit 632 receives input of a request for update to a trial version license from a user via the operation display unit 220.

Figure 21:
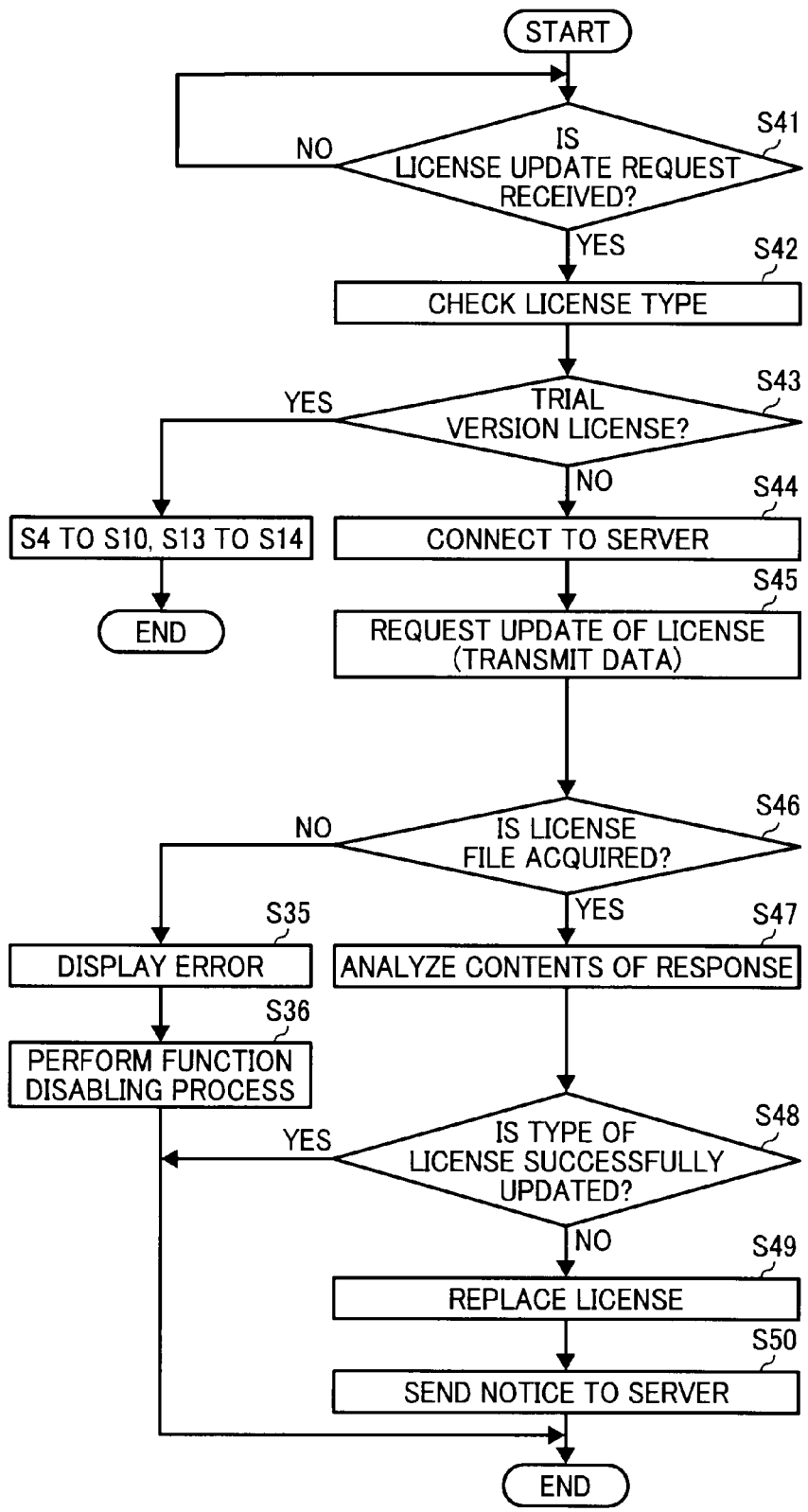
FIG. 21 is a flowchart of a procedure of a process of updating an official license to a trial version license.

Described below is a procedure of a process of updating an official license to a trial version license. FIG. 21 is a flowchart of the procedure of the process of updating the official license to the trial version license.

The update-request receiving unit 632 checks whether a request for update to the trial version license is received from a user or not (Step S41). When the update-request receiving unit 632 receives input of the request for update to the trial version license (YES at Step S41), the class identifying unit 134 checks a type of a license of the license file stored in the HDD 103 (Step S42).

The processes from Step S43 to Step S45 are the same as those at Step S3 to Step S5 of the flowchart of the update process according to the first embodiment, and therefore, explanation thereof is not repeated.

At Step S46, the license-file acquiring unit 137 checks whether a license file is acquired from the license management server 300 or not (Step S46). At this time, the detecting unit 133 detects whether the expiration date in the license file stored in the HDD 103 has passed or not. When the expiration is detected, the license-file acquiring unit 137 acquires a license file of a trial version license from the license management server 300. On the other hand, when the expiration is not detected, the license-file acquiring unit 137 acquires a license file in which an expiration date of a trial version license is added to the expiration date contained in the license file stored in the HDD 103.

Processes at Step S47 to Step S50 are the same as those at Step S29 to Step S32 of the flowchart of the update process according to the second embodiment, and therefore, explanation thereof is not repeated.

As another example, at Step S46, the expiration date contained in the license file that the license-file acquiring unit 137 is to acquire from the license management server 300 may be set by adding time to the expiration date of the trial version license to remaining time to the expiration date of the deactivated license.

Furthermore, as still another example, at Step S46, the expiration date contained in the license file that the license-file acquiring unit 137 is to acquire from the license management server 300 may be set by adding time to the expiration date of the trial version license to unused time in which the application is not used within the time to the expiration date of the deactivated license.

Moreover, as still another example, at Step S46, when it is not detected that the expiration date contained in the license file stored in the HDD 103 has passed, the license-file acquiring unit 137 may acquire the trial version license after the expiration date contained in the license file passes.

As described above, according to the embodiment, when a user manually deactivates a license and then manually inputs an update request, a procedure of the update operation need not be started from the initial state. Therefore, it is possible to enhance the convenience of the update process.

Furthermore, as described above, according to the embodiment, the expiration date of the trial version license is added to the remained time or the suspended time within the time to the expiration date of the license which deactivated by a user. Therefore, it is possible to save the time in which the license is not used.

The license update program to be executed by the image processing apparatus according to the embodiment can be configured so as to be provided as being recorded in a computer-readable recording medium such as a CD-ROM, a flexible disk (FD), or a CD-R, a DVD (Digital Versatile Disk), in an installable and executable format.

Moreover, the license update program to be executed by the image processing apparatus of the embodiment can be configured so as to be stored in a computer connected to a network such as the Internet so that the computer programs are provided by downloading via the network. The license update programs to be executed by the image processing apparatus of the embodiment can be configured so as to be provided or distributed via a network, such as the Internet.

Furthermore, the license update program of the embodiment can be configured so as to be provided as being built in a ROM or the like.

The license update program to be executed by the image processing apparatus of the embodiment have a module structure made up of the above-mentioned units (the installing unit, the detecting unit, the class identifying unit, the update-process determining unit, the update requesting unit, the license file acquiring unit, the replacing unit, the display control unit, and the communication control unit). As actual hardware, the CPU (processor) reads the license update programs from the ROM and executes them to load the units on the main memory, thereby generating the installing unit, the detecting unit, the class identifying unit, the update-process determining unit, the update requesting unit, the license file acquiring unit, the replacing unit, the display control unit, and the communication control unit on the main memory.

The computer program to be executed by the image processing apparatus of the embodiment to implement the installing unit, the detecting unit, the class identifying unit, the update-process determining unit, the update requesting unit, the license file acquiring unit, the replacing unit, the display control unit, and the communication control unit are provided as being built in a ROM or the like.

In the embodiments described above, the examples have been explained in which the image processing apparatus of the present invention is applied to the MFP having at least two functions from among a copy function, a printer function, a scanner function, and a facsimile function. However, the present invention can be applied to any image processing apparatuses such as a copier, a printer, a scanner, a facsimile machine, and the like.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An apparatus comprising:
    a processor;
    a memory;
        a storage device configured to store therein application software and a license file to the application software, wherein the license file includes an expiration date of a license of the application software and a class of the license of the application software, wherein the class includes a trial version that allows the application software to be used on a trial basis or an official version that allows the application software to be used with a right of use;
        a network interface configured to connect to a license management server that manages the license of the application software;
        a detecting unit configured to detect whether the expiration date included in the license file has passed;
        a class identifying unit configured to identify whether the class of the license whose expiration date is detected as having passed is the trial version or the official version;
        an update-process determining unit configured to determine a method of performing a license update process, wherein in response to the class identifying unit identifying the class of the license as the trial version, the update-process determining unit determines the method as a first update method, in which the license file stored in the storage device is replaced with a license file of the official version, and
        in response to the class identifying unit identifying the class of the license as the official version, the update-process determining unit checks, through the license management server, whether the license update process has been completed by a user, and when the license update process has not been completed, the update-process determining unit determines the method as a second update method, in which the license file stored in the storage device is replaced with a license file of the trial version;
        a license-file acquiring unit configured to when the update-process determining unit determines the method as the first update method, acquire the license file of the official version from the license management server, and
        when the update-process determining unit determines the method as the second update method, acquire the license file of the trial version from the license management server; and
        an updating unit configured to replace the license file stored in the storage device with either the license file of the official version or the license file of the trial version that is acquired by the license-file acquiring unit,
    wherein the memory is configured to store the detecting unit, the class identifying unit, the update-process determining unit, the license-file acquiring unit, and the updating unit and the processor is configured to implement the detecting unit, the class identifying unit, the update-process determining unit, the license-file acquiring unit, and the updating unit.

2. The image processing apparatus according to claim 1, wherein
    the update-process determining unit further includes
        a checking unit that checks, when the identified class corresponds to the trial version, with the license management server whether the license update process by the user is completed or not, and
    when it is confirmed that the update process by the user is not completed, the update-process determining unit determines the update process to be performed by using a second update method of updating the license file stored in the storage device based on the license file of a new trial version,
    the license-file acquiring unit acquires the license file of the new trial version from the license management server; and
    the updating unit replaces the license file stored in the storage device with the license file of the new trial version acquired by the license-file acquiring unit.

3. A remote management system that includes an image processing apparatus and a license management server that manages a license of an application, wherein
    the image processing apparatus includes
        a processor;
        a memory;
        a storage device configured to store therein application software and a license file to the application software, wherein the license file includes an expiration date of a license of the application software and a class of the license of the application software, wherein the class includes a trial version that allows the application software to be used on a trial basis or an official version that allows the application software to be used with a right of use;
        a network interface configured to connect to the license management server that manages the license of the application software;
        a detecting unit configured to detect whether the expiration date included in the license file has passed;
        a class identifying unit configured to identify whether the class of the license whose expiration date is detected as having passed is the trial version or the official version;
        an update-process determining unit configured to determine a method of performing a license update process, wherein
        in response to the class identifying unit identifying the class of the license as the trial version, the update-process determining unit determines the method as a first update method, in which the license file stored in the storage device is replaced with a license file of the official version, and in response to the class identifying unit identifying the class of the license as the official version, the update-process determining unit checks, through the license management server, whether the license update process has been completed by a user, and when the license update process has not been completed, the update-process determining unit determines the method as a second update method, in which the license file stored in the storage device is replaced with a license file of the trial version;

a license-file acquiring unit configured to when the update-process determining unit determines the method as the first update method, acquire the license file of the official version from the license management server, and when the update-process determining unit determines the method as the second update method, acquire the license file of the trial version from the license management server; and an updating unit configured to replace the license file stored in the storage device with either the license file of the official version or the license file of the trial version that is acquired by the license-file acquiring unit, wherein the memory is configured to store the detecting unit, the class identifying unit, the update-process determining unit, the license-file acquiring unit, and the updating unit and the processor is configured to implement the detecting unit, the class identifying unit, the update-process determining unit, the license-file acquiring unit, and the updating unit, and the license management server includes a receiver that receives a request to update a license from the image processing apparatus; and a transmitter that transmits a license file according to the request.

4. A non-transitory computer-readable storage medium having computer-readable program codes embodied in the storage medium to be executed by a computer that includes a storage unit configured to store therein application software and a license file to the application software, wherein the license file includes an expiration date of a license of the application software and a class of the license of the application software, wherein the class includes a trial version that allows the application software to be used on a trial basis or an official version that allows the application software to be used with a right of use, the program codes when executed causing the computer to execute:

connecting to a license management server that manages the license of the application software;

acquiring the expiration date from the license file;

detecting whether the expiration date acquired at the acquiring has passed;

identifying whether the class of the license whose expiration date is detected as having passed at the determining is the trial version or the official version;

determining a method of performing a license update process, the determining including in response to the identifying the class of the license as the trial version, determining the method as a first update method, in which the license file stored in the storage unit is replaced with a license file of the official version, and in response to the identifying the class of the license as the official version, checking, through a license management server, whether the license update process has been completed by a user, and when the license update process has not been completed, determining the method as a second update method, in which the license file stored in the storage unit is replaced with a license file of the trial version;

acquiring a license file from the license management server, the acquiring the license file including when the determining determines the method as the first update method, acquiring the license file of the official version from the license management server, and when the determining determines the method as the second update method, acquiring the license file of the trial version from the license management server; and replacing the license file stored in the storage unit with either the acquired license file of the official version or the acquired license file of the trial version.

5. The apparatus according to claim 1, wherein the expiration date included in the license file is an expiration date of a trial version license added to the expiration date of the license.

6. The remote management system according to claim 3, wherein the expiration date included in the license file is an expiration date of a trial version license added to the expiration date of the license.

7. The non-transitory computer-readable storage medium according to claim 4, wherein the expiration date included in the license file is an expiration date of a trial version license added to the expiration date of the license.

* * * * *